United States Patent [19]
Ohshima et al.

[11] Patent Number: 5,909,512
[45] Date of Patent: *Jun. 1, 1999

[54] METHOD AND APPARATUS TO REDUCE SCINTILLATION IN DITHERED DISPLAY SYSTEMS

[75] Inventors: Masamichi Ohshima, Tokyo; Takeshi Makita, Kawasaki; Shuntaro Aratani, Machida; Kazumi Suga, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/341,065

[22] Filed: Nov. 16, 1994

[30] Foreign Application Priority Data

Nov. 18, 1993 [JP] Japan ................................. 5-288963
Nov. 18, 1993 [JP] Japan ................................. 5-288964

[51] Int. Cl.$^6$ .............................. G06K 9/40; H04N 1/40
[52] U.S. Cl. .......................... 382/251; 382/270; 327/75; 358/465
[58] Field of Search ............................. 348/798, 22, 147, 348/405; 345/122; 327/75, 74; 358/466, 465, 456, 457

[56] References Cited

U.S. PATENT DOCUMENTS

| | | | |
|---|---|---|---|
| 3,562,420 | 2/1971 | Thompson | 178/6 |
| 3,959,583 | 5/1976 | Judice et al. | 178/7.3 D |
| 3,997,719 | 12/1976 | Judice | 178/7.3 |
| 4,531,160 | 7/1985 | Ehn | 348/798 |
| 5,122,783 | 6/1992 | Bassetti, Jr. | 340/701 |
| 5,272,469 | 12/1993 | Memarzadeh | 358/173 |

FOREIGN PATENT DOCUMENTS

WO8000646  4/1980  WIPO ............................... H04N 7/12

OTHER PUBLICATIONS

"Digital Video: A Buffer–Controlled Dither Processor For Animated Images", C. Judice, IEEE Transactions On Communications, vol. Com–25, No. 11, Nov. 1977, NY, USA, pp. 1433–1440.

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

An image processor includes a quantizing unit which quantizes input image data to data of at least three or more levels. A memory stores the quantized data on a picture unit basis, and an output unit outputs the stored image on the picture unit basis. The quantizing unit quantizes the image data of a present picture in accordance with the quantized data of a previous picture stored in the memory, and quantizes the input image data of one pixel to the data of three or more levels by using a plurality of threshold values each including an upper threshold value, a standard threshold value and a lower threshold value.

16 Claims, 18 Drawing Sheets

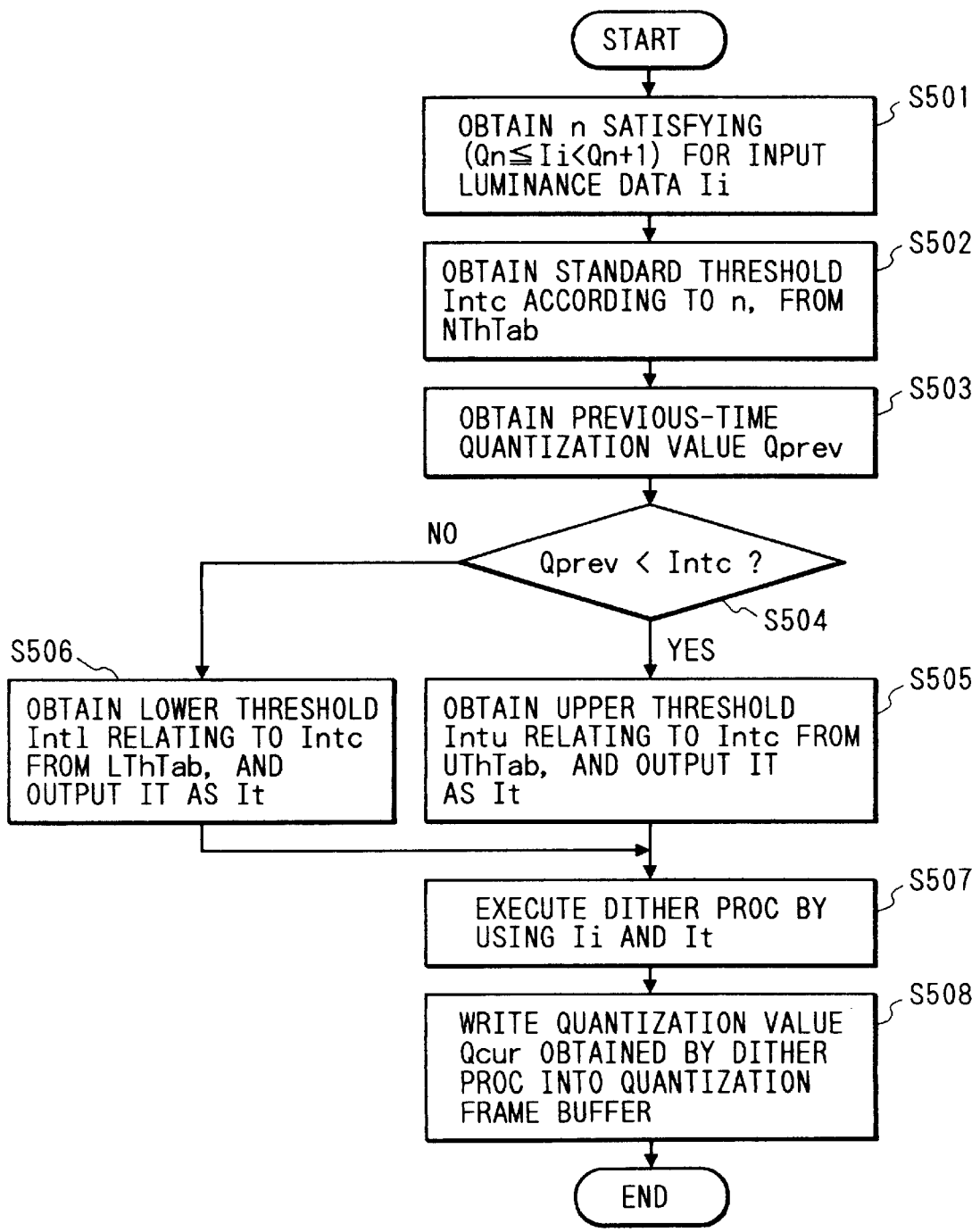

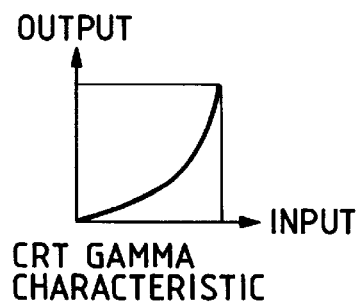
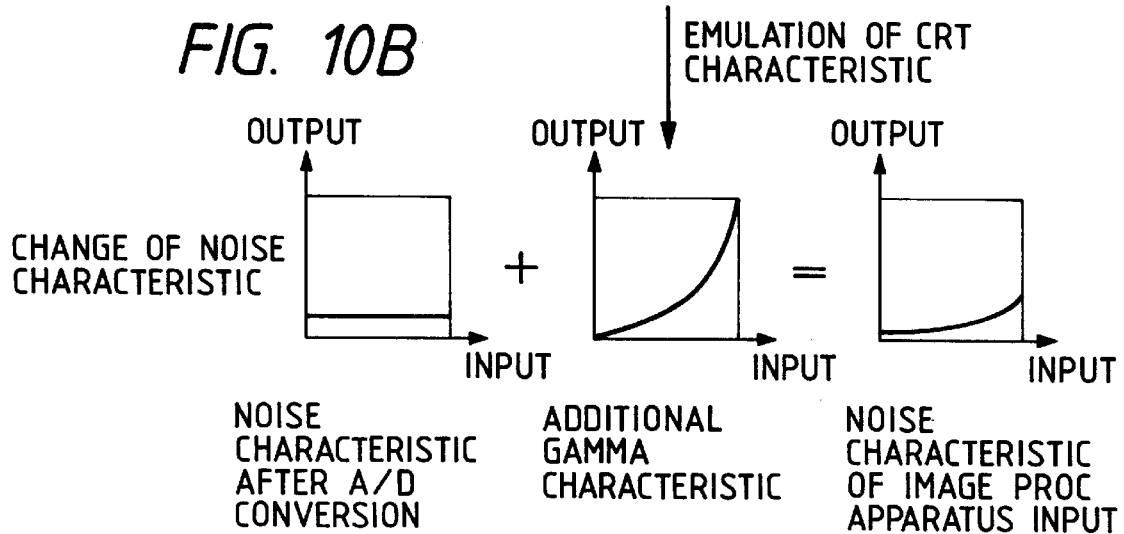
FIG. 10A CRT GAMMA CHARACTERISTIC
FIG. 10B CHANGE OF NOISE CHARACTERISTIC
EMULATION OF CRT CHARACTERISTIC
NOISE CHARACTERISTIC AFTER A/D CONVERSION + ADDITIONAL GAMMA CHARACTERISTIC = NOISE CHARACTERISTIC OF IMAGE PROC APPARATUS INPUT
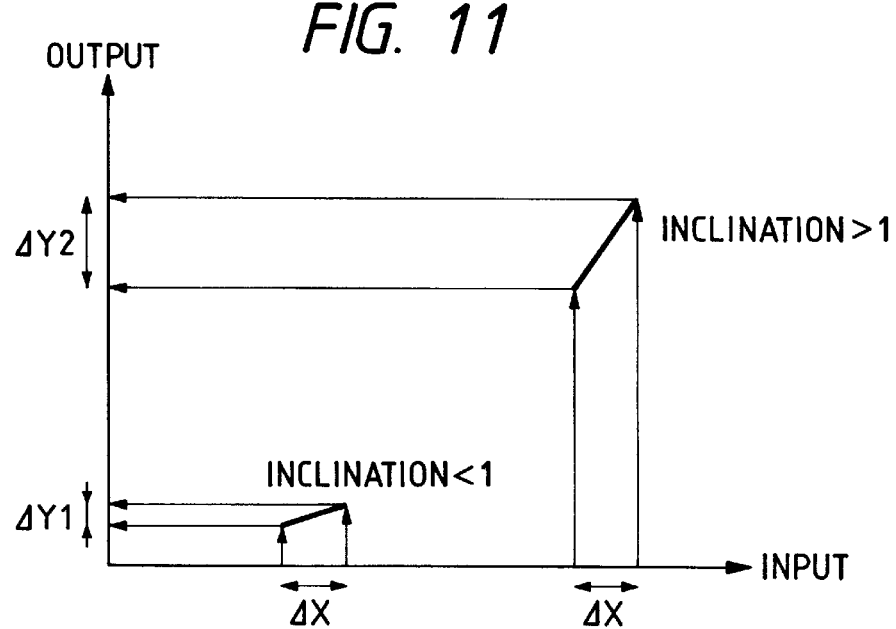
FIG. 11

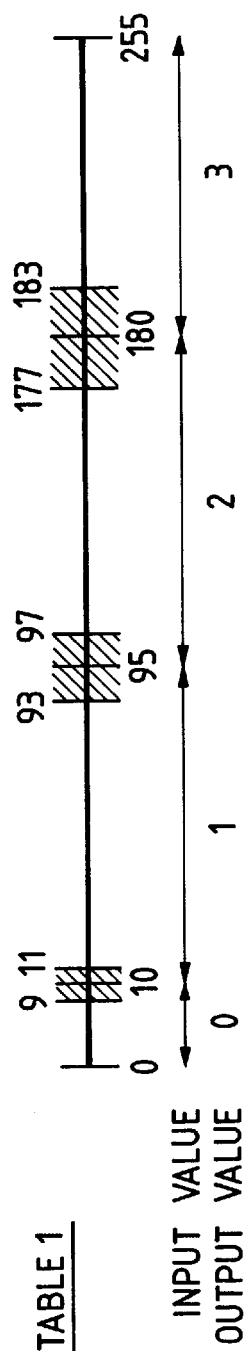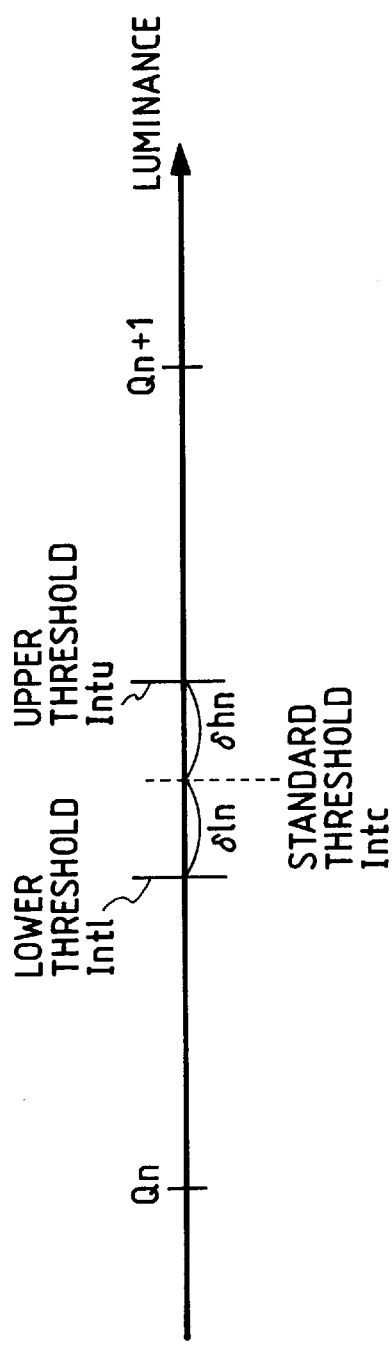

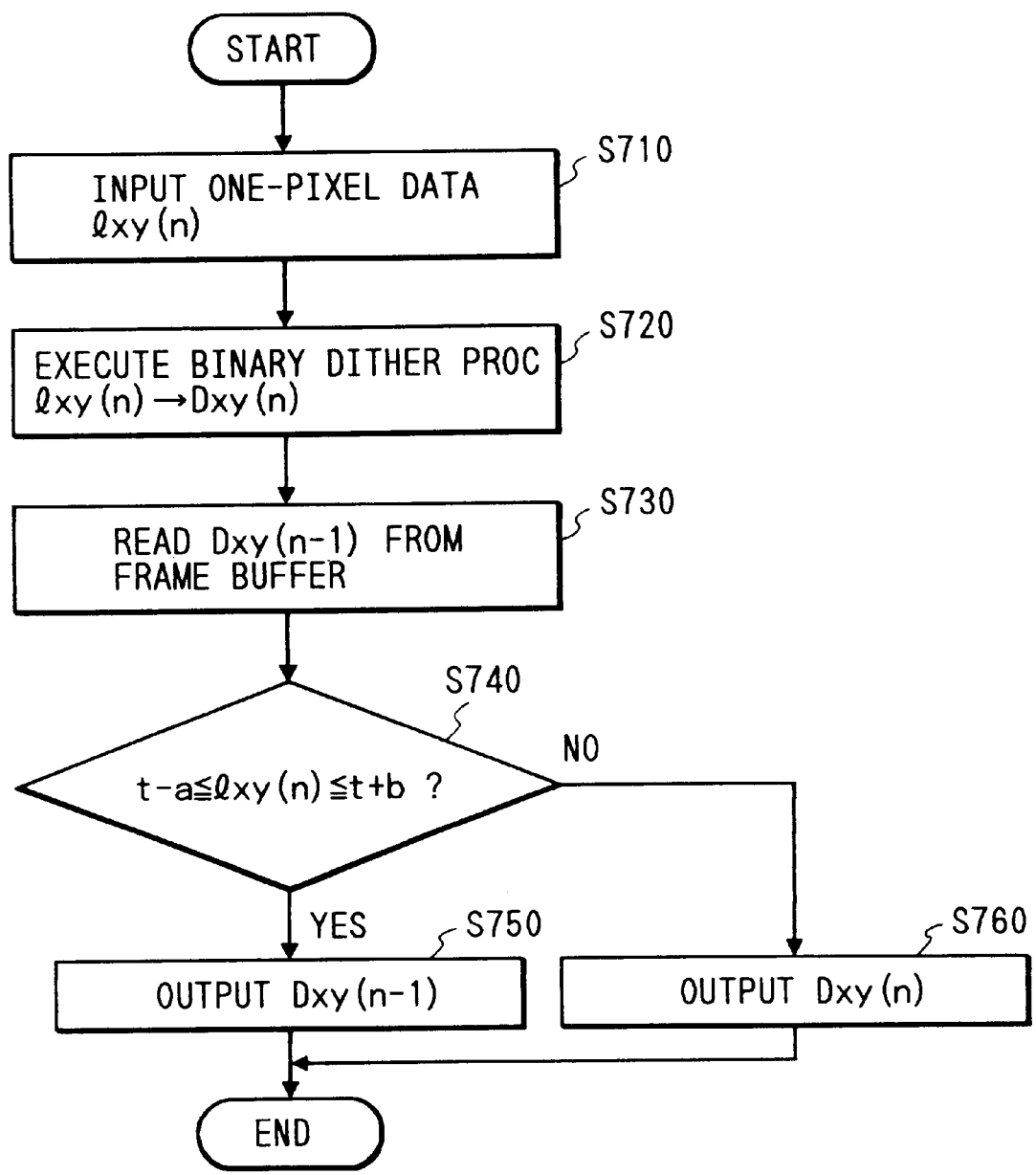

FIG. 24

THRESHOLD = 20

| FRAME | | 1 | 2 | 3 | 4 | 5 | 6 | 7 | 8 |
|---|---|---|---|---|---|---|---|---|---|
| INPUT VALUE (20) | | 21 | 19 | 20 | 21 | 19 | 20 | 19 | 20 |
| PROC RESULT | A | 1 | 0 | 1 | 1 | 0 | 1 | 0 | 1 |
| | B | 1 | 0 | 0 | 0 | 0 | 0 | 0 | 0 |
| INPUT VALUE (19) | | 18 | 19 | 18 | 20 | 18 | 19 | 20 | 19 |
| PROC RESULT | A | 0 | 0 | 0 | 1 | 0 | 0 | 1 | 0 |
| | B | 0 | 0 | 0 | 0 | 0 | 0 | 0 | 0 |

METHOD AND APPARATUS TO REDUCE SCINTILLATION IN DITHERED DISPLAY SYSTEMS

BACKGROUND OF THE INVENTION

1. Field of the Invention

The invention relates to image processing method and apparatus for inputting digital image data and converting to image data whose number of bits is smaller than that of the input data and, more particularly, to image processing method and apparatus for enabling a half tone image to be displayed for a display using, for example, a ferroelectric liquid crystal and having a gradation expressing ability of a small number of gradations such as two values, four values, or the like.

2. Related Background Art

A ferroelectric liquid crystal (hereinafter, simply referred to as an FLC) display among liquid crystal displays has a feature such that the liquid crystal has a "memory performance" to hold a display state changed by applying an electric field, so that a contrast is not deteriorated even if the number of scan lines increases. Therefore, an attention is paid to the FLC display as a device which can display by a large screen and at a high precision even in a simple matrix structure.

However, the FLC fundamentally can express only two gradations by one element. Even in case of displaying one pixel by a plurality of elements, the number of gradations which can be expressed is four values, six values, eight values, or the like and its gradation expressing ability is low.

Hitherto, a half tone process such as dither method, error diffusion method, or the like has been used as a method of improving the gradation expressing ability of a display device of a low gradation expressing ability. Such half tone processing methods have already widely been used in a printer apparatus of a binary output and the like.

According to the dither method, although an output value is decided by comparing an input value and a predetermined threshold value, by changing the threshold value in a predetermined area, a half tone is expressed in the predetermined area in a macro manner. As an example of a multi-value dither in which the dither process is executed to a device of a multivalue output, a case where a 4-level dither process by a (2×2) dither matrix is executed to input data of eight bits and a 4-level output of 0 to 3 is obtained will now be described with reference to the drawings. In case of the 4-level dither of the (2×2) dither matrix, four threshold tables each having three threshold values as shown in FIG. 2 are used in correspondence to cells; of a dither matrix as shown in FIG. 3. The dither matrix is moved and applied to each pixel in the image data at a period of two pixels in both of the vertical and horizontal directions. The corresponding pixel data is compared with a proper one of the threshold tables, and either one of the four values which can be outputted by the device is selected and outputted. For example, assuming that the input data is 100 and the pixel position corresponds to the position of the dither matrix 1 in FIG. 3, a threshold table 1 is applied. In this case, since 100 is larger than the second small threshold value 95 in a threshold table 1, an output value is set to 2. However, in the case where the pixel position corresponds to the position of 2 of the dither matrix, a threshold table 2 is selected. Even when the input value is equal to 100, since it is smaller than a threshold value 117, the output value is set to 1. In the case where the pixel positions correspond to the positions of 3 and 4 of the dither matrix, the output values are also set to 1. In such an area of (2×2), a combination of outputs of 2/1/1/1 is obtained and a half tone of 1.25 is expressed as a whole matrix. By also executing similar processes to the other input values, a correspondence relation of the input value/output value as shown in FIG. 2 is obtained every pixel position. A half tone can be falsely obtained as a combination of them.

However, when the image which was dither processed is continuously displayed on the display or the like as a moving image, in case of a system construction such that noises are mixed to the input data, there is a situation such that the input data changes while fluctuating near the threshold value due to the noises in spite of the fact that the input value is inherently equal.

For example, in FIG. 2, in the case where although the input data at the pixel position to be compared with the threshold table 1 is equal to 94 at the Nth frame, it changes from 94 to 96 by the noises at the (N+1)th frame, the output value changes from 1 to 2. Further, when the input data is returned to 94 at the (N+2)th frame, the output value also changes from 2 to 1. Therefore, even when the fluctuation of the input value is small, such a fluctuation is magnified and appears in a change in output. When such a phenomenon occurs in the whole screen, a flickering phenomenon of the whole screen, namely, so called scintillation noises occur. A display quality of a moving image is remarkably deteriorated. There is a drawback such that an occurrence frequency of the above problem is likely to increase as the number of gradations of the output value is large, namely, as the number of threshold values is large.

SUMMARY OF THE INVENTION

It is an object of the invention to eliminate the drawback of the conventional technique as mentioned above and to provide an image processing method and apparatus which can suppress the generation of scintillation noise and can display an image of a high quality.

Another object of the invention is to provide an image processing method and apparatus which can suppress the generation of scintillation noise when data of one pixel is quantized to multivalue data of at least a 3-level or higher by using a plurality of threshold values.

Still another object of the invention is to provide an image processing method and apparatus in which when data of one pixel is quantized to multivalue data by using a plurality of threshold values scintillation noises is suppressed. This is accomplished by providing an upper threshold value and a lower threshold value for all of the threshold values, since it is possible that the scintillation noise is generated near all of the threshold values.

Further another object of the invention is to provide image processing method and apparatus which can accomplish both of the reduction of scintillation noise and the high picture quality by changing a deviation amount from a standard threshold value for each of a plurality of threshold values.

The above and other objects and features of the present invention will become apparent from the following detailed description and the appended claims with reference to the accompanying drawings.

BRIEF DESCRIPTION OF THE DRAWINGS

FIG. 9 is a flowchart showing a dither process in the image processing apparatus 203;

FIGS. 10A and 10B are diagrams showing changes in characteristics of a noise component which is caused by adding a gamma characteristic;

FIG. 11 is a diagram showing the relations among an input fluctuation due to an inclination of a gamma characteristic curve, an output, and an output fluctuation;

FIG. 13 is a diagram showing an example of a threshold table which is used in the second embodiment;

FIG. 14 is a diagram showing another example of threshold values in a hysteresis dither method;

FIG. 19 is a flowchart showing the operation of an image processing unit 842 in case of executing a binary dither process of (2×2) pixels;

FIG. 24 is a diagram showing an example of an output value of every frame in the case where an input luminance value fluctuates by ±1 around 20 and 19 as centers, respectively.

DETAILED DESCRIPTION OF THE PREFERRED EMBODIMENTS

Preferred embodiments of the present invention will now be described hereinbelow in detail with reference to the drawings.

First embodiment

Figure 1:
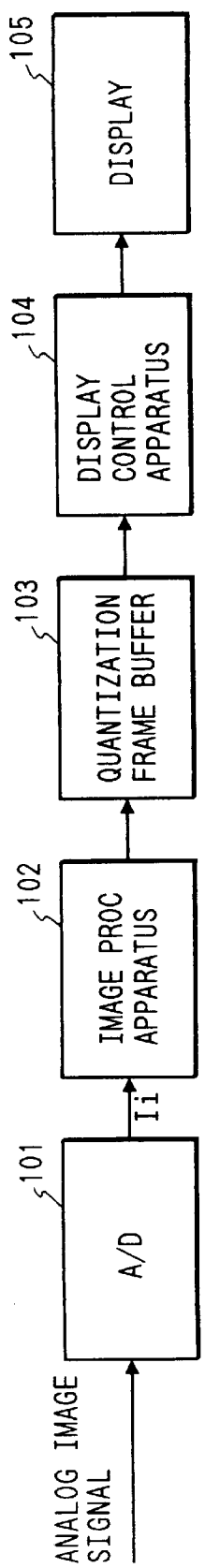
FIG. 1 is a block diagram showing a construction of an image processing system according to the first embodiment of the invention.
Figure 3:
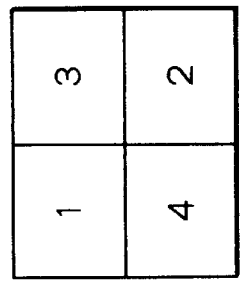
FIG. 3 is a diagram showing a dither matrix table.

FIG. 1 is a block diagram showing a construction of an image processing system (hereinafter, also simply referred to as a system) according to a typical embodiment of the invention. In the system, an analog moving image signal which was raster framed is inputted and converted to digital data of eight bits by an A/D converter 101. The produced multivalue digital image signal ($I_i$) of eight bits is quantized to the data of, for example, two bits by a multivalue dither method by an image processing apparatus 102. The quantized image data obtained is stored into a quantization frame buffer 103. The quantized image data is read out by a display control apparatus 104 and is displayed by a display 105 such as an FLC display or the like. Such a series of operations are executed for the image data input in a real-time manner.

The analog moving image signal which is inputted to the system includes noises which are mixed to a transfer system (not shown). Even in an A/D converting process in the A/D converter 101, a conversion error occurs by an incomplete waveform which is peculiar to the analog signal. Therefore, the digital image signal which is inputted to the image processing apparatus 102 has noise components for the inherent digital data produced on the transmission side of the analog image signal. In the system, it is assumed that such a noise component has a small amount such that it can be statistically handled by numerical values like a standard deviation.

Figure 4:
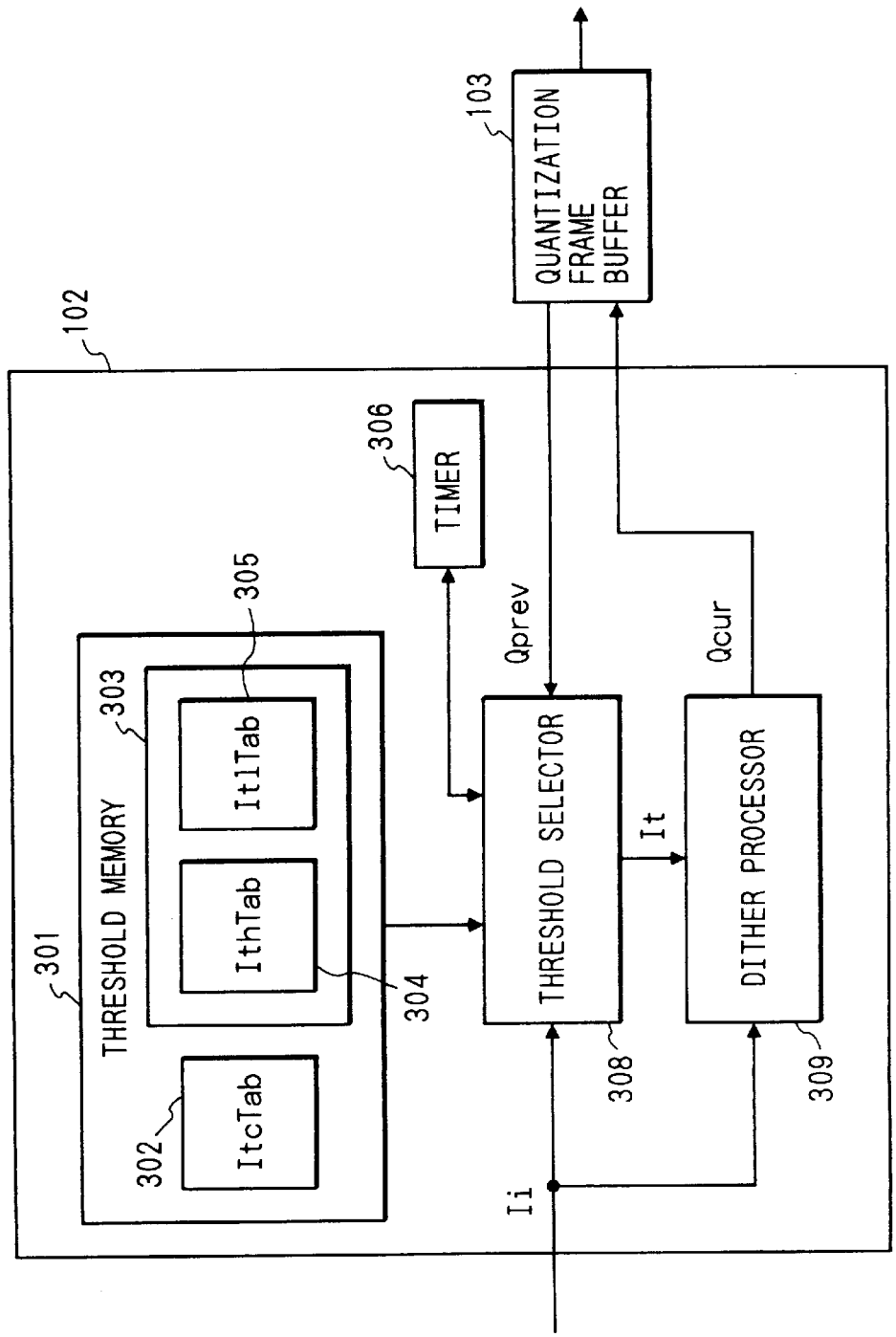
FIG. 4 is a block diagram showing a detailed construction of an image processing apparatus 102.

FIG. 4 is a block diagram showing a detailed construction of the image processing apparatus 102.

The construction and operation of the image processing apparatus 102 will now be described hereinbelow with reference to FIG. 4.

Reference numeral 301 denotes a threshold memory to store a plurality of threshold tables for the dither process. As shown in FIG. 4, the threshold memory 301 stores a standard threshold table (ItcTab) 302, an upper threshold table (IthTab) 304, and a lower threshold table (ItlTab) 305. The upper threshold table 304 and lower threshold table 305 are together called a deviation threshold table 303.

Values which are apart from a threshold value set in the standard threshold table (ItcTab) 302 in the plus and minus directions by only $\delta_h$ and $\delta_l$ are held in the deviation threshold table 303. $\delta_h$ and $\delta_l$ can have values every threshold value. Deviation threshold values which are independent every threshold value can be set into the upper threshold table (IthTab) 304 and lower threshold table (ItlTab) 305, respectively. In the embodiment, a value based on a standard deviation of an amplitude of noises included in the digital image signal ($I_i$) is uniformly set as a deviation threshold value. For example, when explaining the threshold table 1 shown in FIG. 2 as an example, threshold values of (10, 95, 180) are stored in the standard threshold table (ItcTab) 302. Now assuming that $\delta_h = \delta_l = 3$, threshold values of (13, 98, 183) are stored in the upper threshold table (IthTab) 304. Threshold values of (7, 92, 177) are stored in the lower threshold table (ItlTab) 305. The same shall also apply to the other threshold tables 2, 3, and 4.

On the other hand, a threshold selector 308 receives the digital moving image signal ($I_i$) and quantized (dither processed) data ($Q_{prev}$) of one-previous frame corresponding to the same position as that of the pixel that is at present being processed from the quantization frame buffer 103. In accordance with the comparison result of those two values, the most proper threshold table is selected from a plurality of threshold tables held in the threshold memory 301 and is supplied to a dither processor 309. The quantized data Q has a value converted to eight bits in accordance with the input data. For example, in case of converting the data to the 4-level data, the quantization results are (0, 1, 2, 3). However, in case of eight bits, they are set to (0, 85, 170, 255), respectively. The dither processor 309 inputs the digital image signal ($I_i$) and compares with a threshold table ($I_t$) which is supplied from the threshold selector 308, thereby converting to data ($Q_{cur}$) whose number of bits is smaller than the number of bits to express a pixel that is shown by the digital image signal ($I_i$). The data ($Q_{cur}$) is stored to the position corresponding to the quantization frame buffer 103. A timer 306 detects the elapse of predetermined time and sends a detection signal to the threshold selector 308. The threshold selector 308 executes a threshold table selecting process in response to the reception of a detection signal and resets the timer 306 at the same time.

Figure 5:
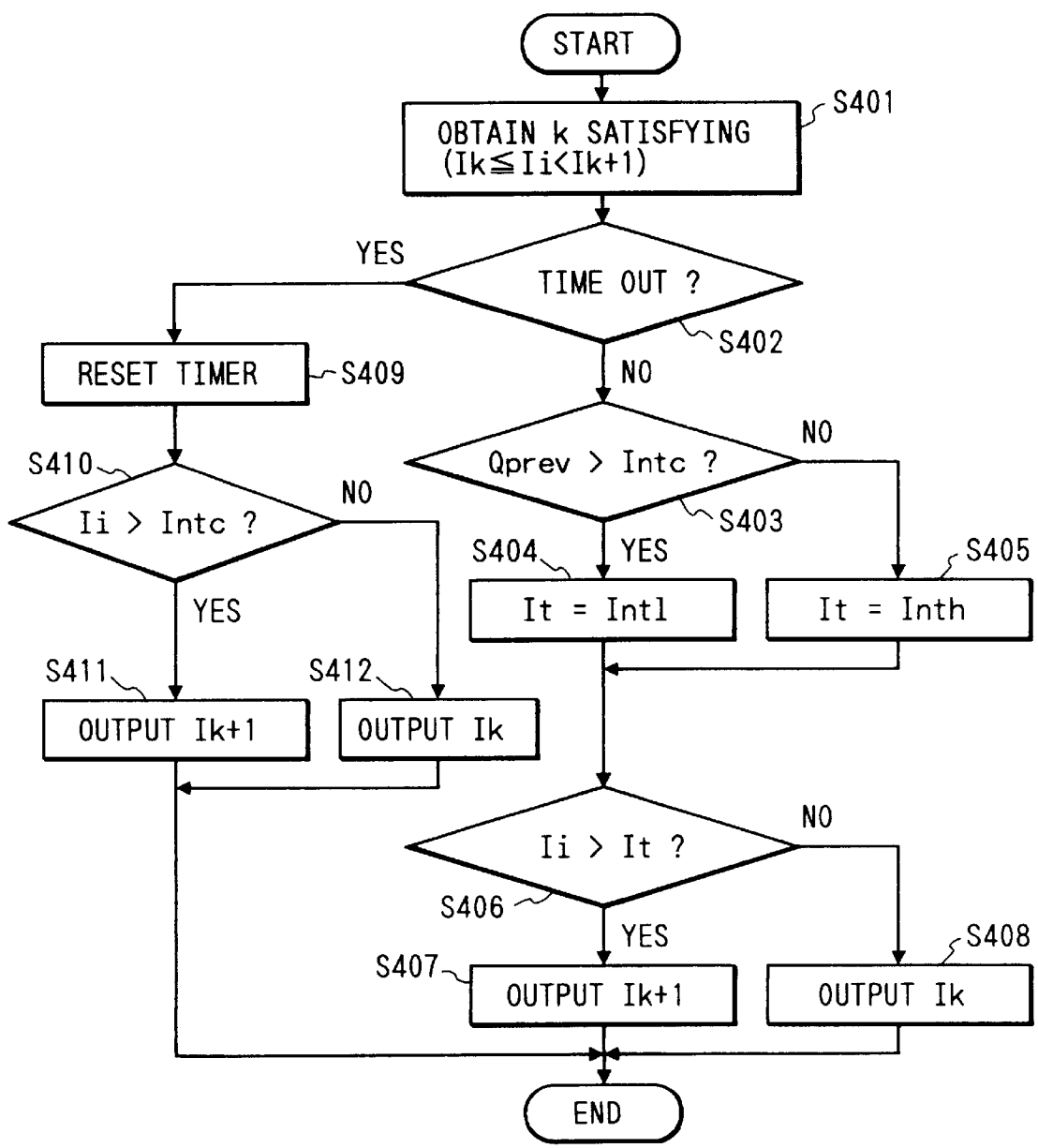
FIG. 5 is a flowchart showing a dither process in the image processing apparatus 102.

The dither process in the image processing apparatus 102 will now be described with reference to a flowchart shown in FIG. 5. The flowchart is executed by a control unit (not shown). Particularly, processes of the threshold selector 308 and dither processor 309 are explained.

First in step S401, a region between which two adjacent values in quantization data $Q_k$ (k=0, 1, 2, . . . , $2^N$−1: N denotes the number of bits of the quantized data) which is obtained as a result of the dither process the inputted digital image data ($I_i$) exists is obtained. When the quantized data $Q_k$ is converted to eight bits, it becomes $I_0$, $I_1$, . . . , $I_k$, $I_{k+1}$, . . . , $I_{(2N-1)}$. For example, assuming N=2, the quantized data has four values of $Q_0$, $Q_1$, $Q_2$, and $Q_3$. When converting to the 8-bit data, the value of $Q_0$ is set to $I_0$=0, the value of $Q_1$ is set to $I_1$=85, the value of $Q_2$ is set to $I_2$=170, and the value of $Q_3$ is set to $I_3$=255. In step S401, the value of k satisfying $I_k \leq I_i \leq I_{k+1}$ is obtained. For example, when $I_i$=20, the value of k is equal to 0. A standard threshold value ($I_{ntc}$) to be compared in the multivalue dither process is determined on the basis of the value of k. The standard threshold value is determined in accordance with the value of k in a manner such that when k=0, the smallest threshold value is set and, when k=1, the second small threshold value is set, and the like.

In step S402, a check is made to see if a time-out detection signal has been generated from the timer 306 or not. When such a signal is not detected, the processing routine advances to step S403. When the signal is detected, step S409 follows.

In step S403, the quantized data ($Q_{prev}$) of the previous frame corresponding to the pixel position of the pixel that is at present being processed is read out from the quantization frame buffer 103 and is compared with the standard threshold value ($I_{ntc}$). As quantization data ($Q_{prev}$) which is used here, the data converted to eight bits is also used.

When $Q_{prev} > I_{ntc}$, the processing routine advances to step S404. A lower threshold value ($I_{ntl}$) is used as a threshold value ($I_t$). When $Q_{prev} \leq I_{ntc}$, the processing routine advances to step 3405 and the upper threshold value ($I_{nth}$) is used as a Threshold value ($I_t$). The threshold value ($I_t$) decided by the processes in steps S403 to S405 is supplied to the dither processor 309 irrespective of the results of the above processes. Thus, the threshold value that is actually used is selected in the dither processor 309.

In steps S406 to S408, the dither processor 309 executes the dither process by using the threshold value ($I_t$) which is selected and outputted by the threshold selector 308 and the input digital image signal ($I_i$).

Namely, the magnitude relation between $I_t$ and $I_i$ is examined in step S406. When $I_i > I_t$, the processing routine advances to step S407 and the quantized data ($I_{k+1}$) is selected. When $I_i \leq I_t$, step S408 follows and the quantized data ($I_k$) is selected.

On the other hand, when the time-out is detected in step S402, the processing routine advances to step S409 and the timer 306 is reset. In steps S410 to S412, the dither processor 309 subsequently executes the dither process by using the standard threshold value ($I_{ntc}$) and input digital image signal ($I_i$).

Namely, the magnitude relation between $I_{ntc}$ and $I_i$ is examined in step S410. When $I_i > I_{ntc}$, step S411 follows and the quantized data ($I_{k+1}$) is selected. When $I_i \leq I_{ntc}$, the processing routine advances to step S412 and the quantized data ($I_k$) is selected.

Figure 6:
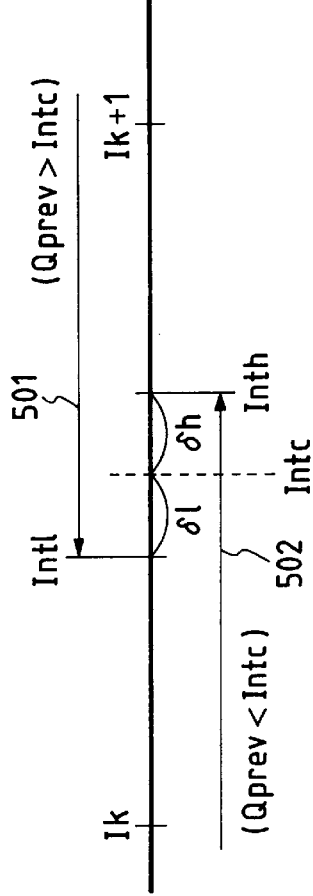
FIG. 6 is a diagram showing schematically the dither process of the first embodiment.

The above processes will now be summarized with reference to FIG. 6.

That is, with respect to the standard threshold value ($I_{ntc}$), the upper threshold value ($I_{nth}$) and lower threshold value ($I_{ntl}$) having the deviations of $\delta_h$ and $\delta_l$ are set. When the digital image signal ($I_i$) at a certain pixel position is inputted, in the case where the quantization result ($Q_{prev}$) of the previous frame at the same pixel position is larger than the standard threshold value ($I_{ntc}$), as shown by an arrow 501 in FIG. 6, the threshold value is set to $I_{ntl}$ and whether $I_i > I_{ntl}$ or not is discriminated by the dither processor 309. On the other hand, when $Q_{prev} \leq I_{ntc}$, as shown by an arrow 502 in FIG. 6, the threshold value is set to $I_{nth}$ and whether $I_i > I_{nth}$ or not is discriminated by the dither processor 309.

According to the embodiment, therefore, the threshold value can be properly shifted on the basis of the dither processing result of the previous frame. As for the input signal which oscillates at positions near the threshold value, so long as its amplitude doesn't exceed ($|\delta_l|+|\delta_h|$), the output is fixed to either one of $I_k$ and $I_{k+1}$. A state in which the dither processing result oscillates between both of $I_k$ and $I_{k+1}$ due to an influence by the noises can be suppressed in spite of the fact that the input data is equal.

Figure 2:
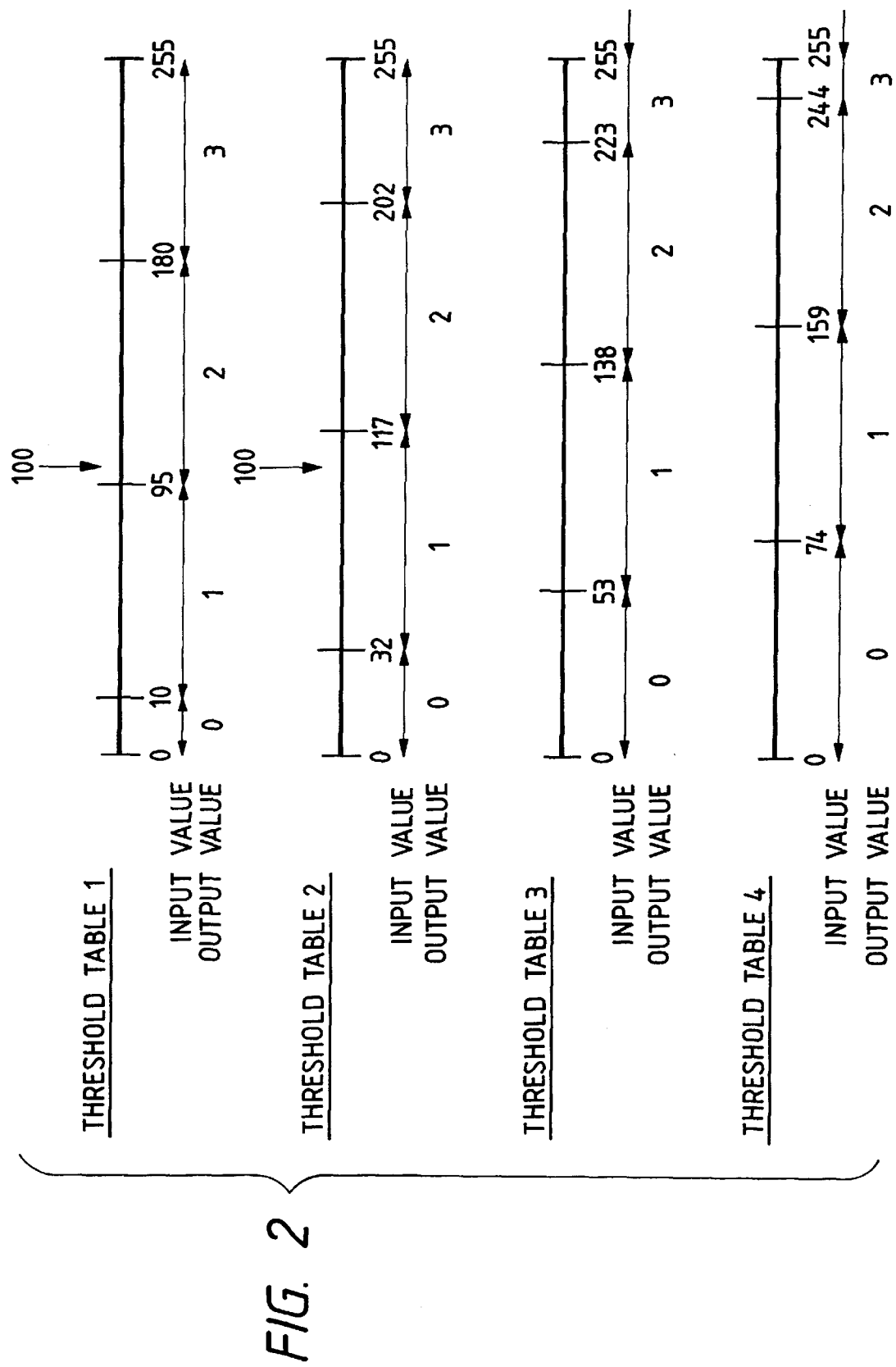
FIG. 2 is a diagram for explaining a multivalue dither process.

In the embodiment, as shown in FIG. 2, in case of quantizing the data of one pixel, the data of one pixel is quantized to the multivalue data by using a plurality of threshold values and by providing the upper threshold value and lower threshold value for all of the threshold values, the generation of the scintillation noises can be suppressed.

In case of executing the dither process by using the upper and lower threshold values, since the threshold values which are deviated from the standard threshold value which should inherently be optimized are used, the picture quality is adversely influenced. In the embodiment, however, as already described in the flowchart of FIG. 5 as well, the dither process is executed by using the standard threshold value every predetermined time, so that the deterioration of the picture quality can be suppressed.

According to the first embodiment as described above, in the case where the first moving picture image data of n gradations per each pixel is inputted and converted into the second moving picture image data of a smaller number of gradations, the first moving picture image data is compared with the second moving picture image data which is one-frame previous and corresponds to the pixel position of the first moving picture image data. In accordance with the comparison result, a microamount is dynamically changed for the threshold value selected for the above conversion and the conversion result can be obtained in consideration of the continuity of the data between frames. Therefore, even if the first moving picture image data such as to oscillate over the selected threshold value due to the mixed noises is inputted, there is an effect such that a state in which the second moving picture image data which is outputted oscillates by such oscillating first moving picture image data is suppressed.

Consequently, even if the second moving picture image data derived is displayed on the display or the like, sparkling noises due to the flickering of the pixel can be suppressed and a higher display quality is obtained.

Although not shown in FIG. 1 of the first embodiment, in the image display system, the conversion of the input and output characteristics according to the display characteristics of the display, namely, what is called a gamma converting process is ordinarily necessary for the input image data.

In case of performing the gamma conversion to the inputted image data, a phenomenon such that the inherent noises are enlarged or reduced occurs due to the inclination of a gamma characteristic curve. Therefore, even if amplitude characteristics such that the noises included in the original input image data are uniform, the amplitude of the noises becomes uneven as a result of the gamma conversion. In the first embodiment, however, since deviation trains which the upper threshold train and lower threshold train have for the standard threshold train are set to be constant, in an area of the enlarged noise amplitude, there is a fear of generation of the scintillation noises. In the area in which the noise amplitude was reduced, since the upper and lower threshold values are too away from the standard threshold value, the picture quality deteriorates.

Therefore, an example in which both of the reduction of the scintillation noises and the high picture quality can be accomplished by changing the deviation amount from the standard threshold value every threshold value will now be described hereinbelow as a second embodiment.

Second embodiment

Figure 7:
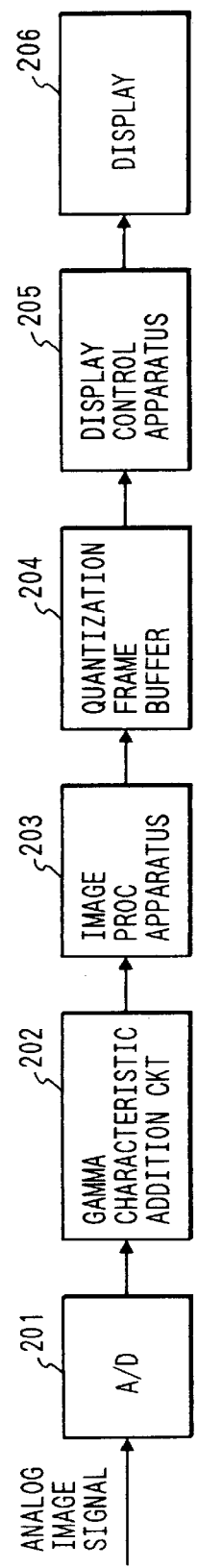
FIG. 7 is a block diagram showing a construction of an image processing system according to the second embodiment.

FIG. 7 is a block diagram showing a construction of an image display system in the second embodiment of the invention. According to this system, the analog moving image signal which was raster framed is inputted and converted to the digital data of eight bits by an A/D converter 201. Gamma characteristics which the CRT has are added to the produced digital image signal by a gamma characteristic addition circuit 202 (which will be explained in detail hereinlater). After that, the image signal is quantized to the data of, for instance, two bits by the dither process by an image processing apparatus 203. The quantized image data derived is stored into a quantization frame buffer 204. The data is read out at any time by a display control apparatus 205 and is displayed to a display 206. The above series of operations are executed to the image data input in a real-time manner.

The analog moving image signal which is inputted to the system includes noises which come from the outside and are mixed to a transfer system. A conversion error due to incompleteness of a waveform which is peculiar to the analog signal occurs in the A/D converting process by the A/D converter 201. Thus, the digital image signal which is supplied to the image processing apparatus 203 has a noise component for the inherent digital data existing on the feeding side of the analog image signal. In the system, however, such a noise component can be statistically handled by numerical values like a standard deviation.

Figure 8:
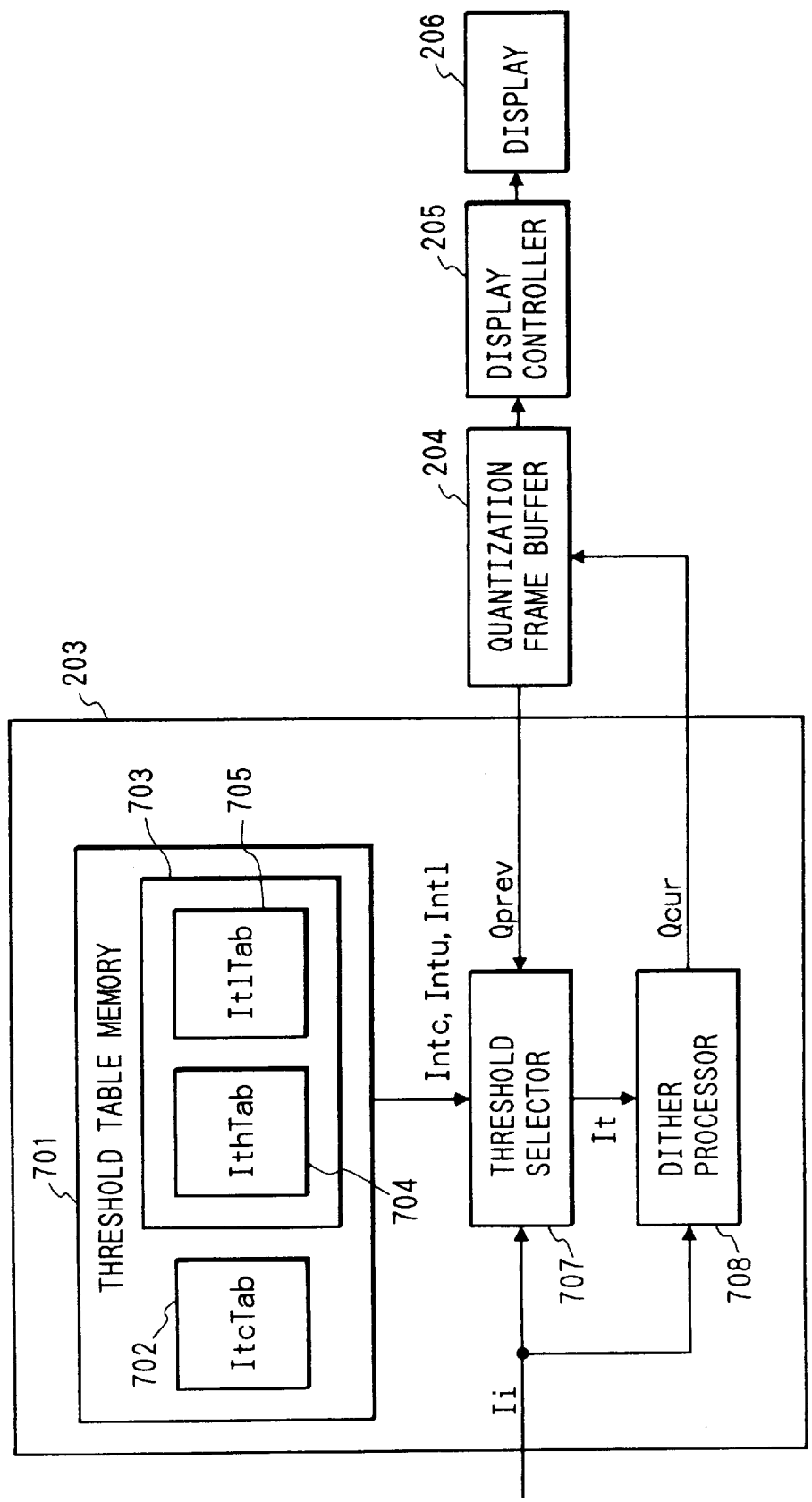
FIG. 8 is a block diagram showing a detailed construction of an image processing apparatus 203.

FIG. 8 is a detailed diagram of the image processing apparatus 203 and it will be explained hereinbelow with reference to the drawing. First, a threshold memory 701 comprises a plurality of threshold tables. Namely, the threshold memory 701 has a standard threshold table (ItcTab) 702, an upper threshold table (IthTab) 704, and a lower threshold table (ItlTab) 705. The upper threshold table 704 and lower threshold table 705 are together called a deviation threshold table 703. Values which are vertically deviated from a threshold value set in the standard threshold table 702 by only $\delta_h$ and $\delta_l$ are held in the deviation threshold table 703, respectively. $\delta_h$ and $\delta_l$ can have values every threshold value. Therefore, the values which are independent every threshold value can be set into the upper threshold table 704 and lower threshold table 705, respectively. A method of deciding the set values will be described later. A threshold selector 707 inputs the digital moving image signal $I_i$ sent from the gamma characteristic addition circuit 202 and inputs the previous-frame data $Q_{prev}$ at the pixel position of the pixel which is at present being processed in the quantization frame buffer 204. A proper threshold value is selected from a plurality of threshold values held in the threshold memory and is supplied to a dither processor 708. A selecting method of the threshold value will be described hereinlater. The dither processor 708 inputs the digital image signal $I_i$ and compares with the threshold value which is supplied from the threshold selector 707, thereby converting to the data whose number of bits is smaller than that of $I_i$ and storing it to the position of the pixel under processing in the quantization frame buffer 204.

FIG. 9 is a flowchart for explaining a process in the threshold selector 707 and a process in the dither processor 708 subsequent to it. First in step S501, a region between which adjacent two values in quantized data $Q_n$ (n=0, 1, 2, ..., $2^N-1$: N denotes the number of bits of the quantized data) which is obtained as a result of the image process the inputted digital image data $I_i$ exists is obtained in the threshold selector 707. As already mentioned above in the first embodiment, when N=2, $Q_n$ is set such that $Q_0$=0, $Q_1$= 85, $Q_2$=170, and $Q_3$=255. A value of (n) satisfying $Q_n \leq I < Q_{n+1}$ is obtained. Thus, the standard threshold value $I_{ntc}$ to be compared in the multivalue dither process is determined. For example, when $I_i$=120, n=1. In the threshold table 1 shown in FIG. 2, when n=1, $I_{ntc}$=95. In step S502, the threshold value $I_{ntc}$ according to the value of (n) is obtained from the standard threshold table (ItcTab) 702. In step S503, the quantized data $Q_{prev}$ of the previous frame corresponding to the pixel position of the pixel which is at present being processed is read out from the quantization frame buffer 204. In step S504, the magnitudes are compared between $Q_{prev}$ and $I_{ntc}$. As $Q_{prev}$ which is used here, in case of quantizing the data to the 4-level data of two bits, the quantizing process is executed in the following manner. Namely, when the quantization result is equal to 0, $Q_{prev}$=0. When the quantization result is equal to 1, $Q_{prev}$=85. When the quantization result is equal to 2, $Q_{prev}$=170. When the quantization result is equal to 3, $Q_{prev}$=255. When $Q_{prev}$ is larger, the lower threshold value $I_{ntl}$ is used as a threshold value $I_t$ in the present pixel process. When $Q_{prev}$ is smaller, an upper threshold value $I_{ntu}$ is used. The threshold selector 707 outputs $I_t$ to the dither processor 708. Thus, the threshold value which is actually used is selected in the dither processor 708. Subsequently, the dither processor 708 executes the dither process as shown in step S507 by using $I_t$ which is selected and outputted by the threshold selector 707 and the input digital image signal $I_i$. The dither processor 708 writes the output value $Q_{cur}$ obtained as a result of the dither process to the present pixel position in the quantization frame buffer 204.

The setting of deviations which the upper threshold value and lower threshold value for the standard threshold value have will now be described.

When the dither method is used in the liquid crystal display having a relatively small number of levels, input/luminance characteristics which are linear as a macro meaning are obtained. However, the CRT has nonlinear input/luminance characteristics called gamma characteristics. In case of a CRT compatible liquid crystal display apparatus, when the user replaces the display from the CRT, in order to prevent that a different color feeling is given to the user, it is desirable that nonlinear characteristics similar to the CRT are purposely added in the interface portion. Therefore, the gamma characteristic addition circuit 202 as shown in FIG. 7 is provided for the display interface of the embodiment.

The gamma characteristic addition circuit 202 adds characteristics as shown in FIG. 10A to the digital input image signal from the A/D converter 101. In this instance, similar characteristics as shown in FIG. 10B are also added to the noises. At this time, as shown in FIG. 11, the amplitude of noises is reduced in an area in which the inclination of the curve of the gamma characteristic is smaller than 1. However, in an area where the inclination is larger than 1, a phenomenon such that the amplitude of noises is contrarily increased occurs. Therefore, if the deviation from the standard threshold value is uniformly set for a plurality of threshold values, as a result of the addition of the gamma characteristic, the set deviation increases to a value larger than it is needed in the area where the inclination of the gamma characteristic curve is smaller than 1, so that the picture quality is deteriorated. On the contrary, in the area where the inclination is larger than 1, the deviation is not enough large. Thus, the influence by the noises cannot be absorbed by the deviation of the threshold value and the scintillation noises are generated.

In the second embodiment, therefore, the value ($3\sigma$) that is about three times as large as the distribution of the noise Component of the signal after completion of the A/D conversion in each standard threshold is set to the deviation of the upper threshold value and the deviation of the lower threshold value, respectively. The inclination of the gamma characteristic curve which is given by the gamma characteristic addition circuit 202 is obtained in each standard threshold value. The inclination is multiplied with the deviation of the upper threshold value and the deviation of the lower threshold value which were obtained before. The resultant values are further added to the standard threshold value. The resultant addition values are set to the upper threshold value and lower threshold value, respectively.

Figure 12:
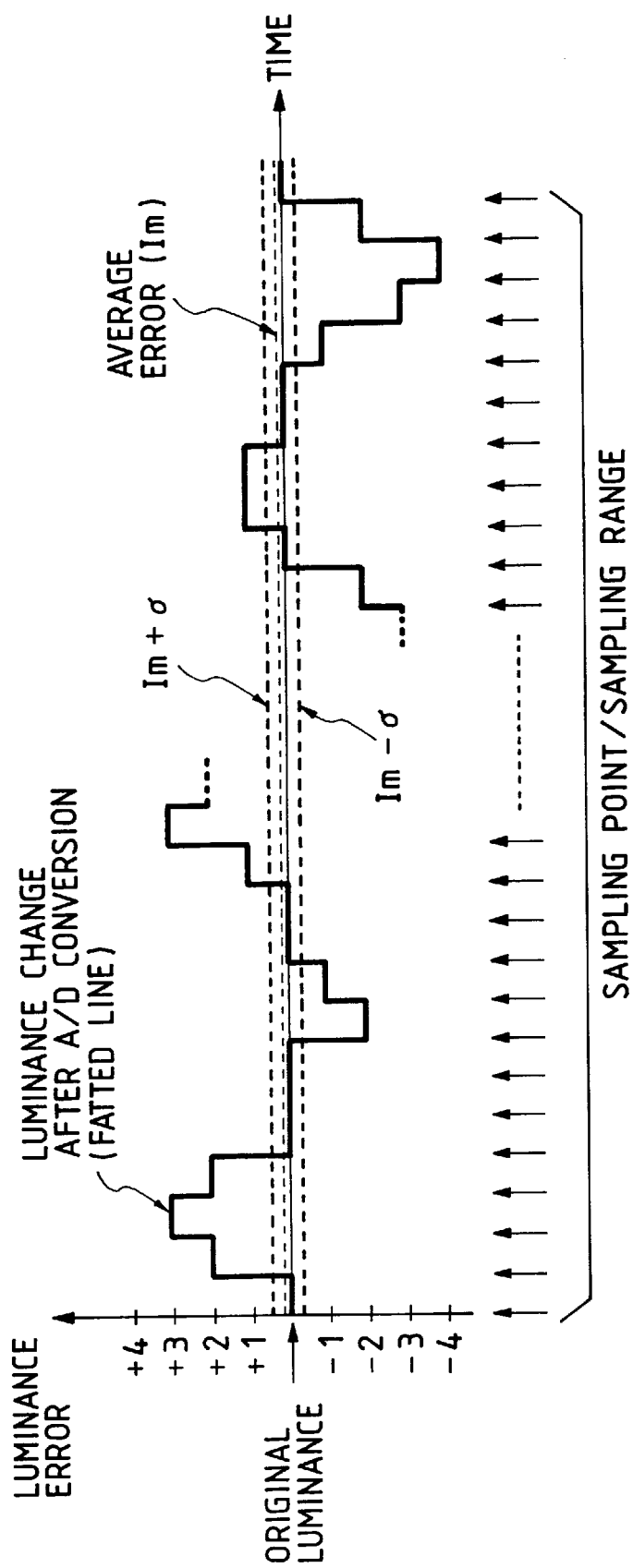
FIG. 12 is a diagram showing a luminance error to an original luminance.

FIG. 12 shows the measurement result of the data which is outputted from the A/D converter when a value of a certain standard threshold value is written as an "original luminance" into a VRAM of the computer. By obtaining an average error ($I_m$) and a distribution value ($\sigma$) from the measurement results, the deviations from the standard threshold values can be decided.

It is now assumed that the following values were obtained from the measurement result in FIG. 12.

Average error ($I_m$)=0.05

Distribution ($\sigma$)=0.40

The deviations are determined as follows in accordance with the inclination of the $\gamma$ characteristic curve on which the standard threshold value is located.

When the inclination of the $\gamma$ characteristic curve is equal to 0.5:

$0.40 \times 3 \times 0.5 + 0.05 = 0.65 \rightarrow$ deviation of upper threshold value=1

$-0.40 \times 3 \times 0.5 + 0.05 = -0.55 \rightarrow$ deviation of lower threshold value=-1

When the inclination of the $\gamma$ characteristic curve is equal to 1.0:

$0.40 \times 3 \times 1.0 + 0.05 = 1.25 \rightarrow$ deviation of upper threshold value=2

$-0.40 \times 3 \times 1.0 + 0.05 = -1.15 \rightarrow$ deviation of lower threshold value=-2

When the inclination of the $\gamma$ characteristic curve is equal to 2.0:

$0.40 \times 3 \times 2.0 + 0.05 = 2.45 \rightarrow$ deviation of upper threshold value=3

$-0.40 \times 3 \times 2.0 + 0.05 = -2.35 \rightarrow$ deviation of lower threshold value=-3

As will be also obviously understood from the above example, since the amplitude of noises increases as the inclination of the $\gamma$ characteristic curve is large, the deviation amount of the threshold value also increases.

FIG. 13 shows the upper and lower threshold values for the standard threshold value shown in the threshold table 1 in FIG. 2. As will be obviously understood from FIG. 13, as the value of the standard threshold value is large, the deviation amount is set to a large value.

When the dither process is executed by using the upper and lower threshold values, the threshold values which are deviated from the standard threshold value which has inherently been optimized are used, so that the picture quality is slightly deteriorated. Therefore, it is desirable to minimize the deviations of the upper and lower threshold values from the standard threshold value. On the other hand, when the deviations are set to be too small, the inherent effect of the hysteresis dither is extinguished and the scintillation noises are generated.

According to the second embodiment, therefore, since the upper and lower threshold values are determined in accordance with the magnitude of the standard threshold value, both of the reduction of the scintillation noises and the preservation of the picture quality can be accomplished.

Although the timer 306 shown in FIG. 4 in the first embodiment is not provided in FIG. 8 of the second embodiment, it is also possible in the second embodiment to provide the timer in a manner similar to the first embodiment and to execute the dither process by using the standard threshold value every predetermined time.

In the second embodiment, the threshold table memory in FIG. 8 includes the standard threshold table 702, upper threshold table 704, and lower threshold table 705. However, an upper threshold deviation table and lower threshold deviation table in which only deviation amounts from the standard threshold value have been stored can be also used in place of the upper threshold table 704 and lower threshold table 705. Thus, the memory capacity of the threshold table memory 701 can be reduced. However, in such a case, when the upper or lower threshold deviation associated with the input value $I_i$ is selected from the upper or lower threshold deviation table, it is necessary that the threshold selector 707 adds the value of the deviation selected in step S505 or S506 in FIG. 9 to the standard threshold value associated with $I_i$ at the same time. The setting of each value of the upper and lower threshold deviations in this case can be executed in a manner similar to the case described in the above second embodiment.

As further another embodiment, a hysteresis dither as a base is realized by the following algorithm. According to the algorithm, as shown in FIG. 14, upper and lower threshold values having deviations of $\delta_{In}$ and $\delta_{hn}$ in the upper/lower directions of the standard threshold value are preset, respectively. For the input luminance signal, in step S601, two adjacent luminances $Q_n$ and $Q_{n+1}$ which can be displayed and which sandwich the input luminance value $I_i$ are examined, thereby obtaining the value of (n). In step S602, the upper threshold value $I_{ntu}$ and lower threshold value $I_{ntl}$ existing between the above two displayable luminances are obtained. In step S603, a check is made to see if the input luminance value $I_i$ exists between $I_{ntu}$ and $I_{ntl}$ or not. When it exists between them, the output value $Q_{prev}$ at the same pixel position of the previous frame is obtained from the quantization frame buffer 204 and is outputted as an output value in the present frame. When the input luminance doesn't exist between $I_{ntu}$ and $I_{ntl}$, the upper threshold value $I_{ntu}$ is used as a threshold value and the dither process is executed. Finally, the output value $Q_{cur}$ is written at the present pixel position in the quantization frame buffer 204. The above series of algorithms eventually output the same value as that of the algorithm shown in FIG. 9. The setting of each value of the upper and lower threshold deviations in cases of using the algorithm shown in FIG. 15 can be also executed in a manner similar to that described in the above second embodiment.

Figure 15:
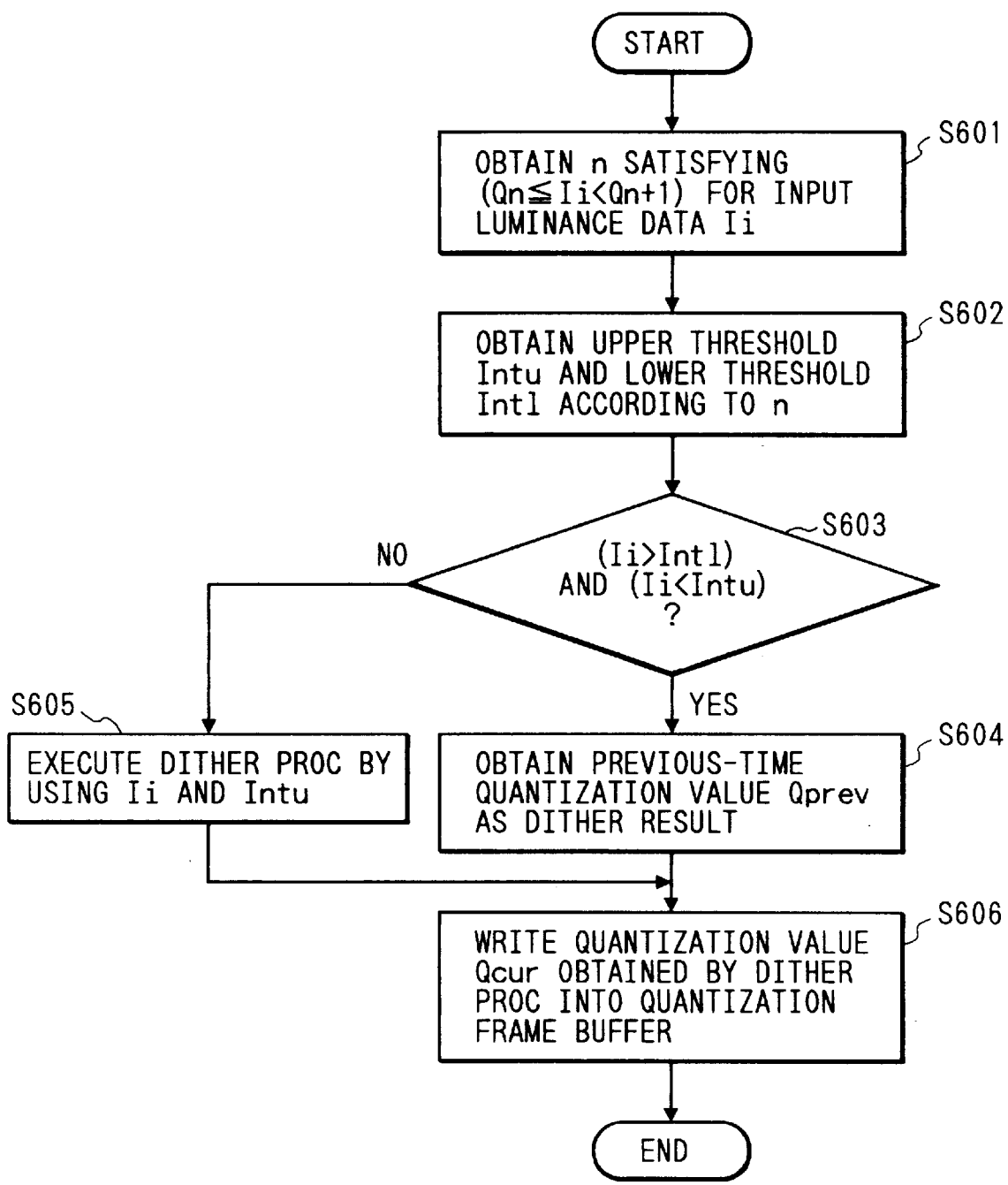
FIG. 15 is a flowchart showing another algorithm of the hysteresis dither method.

The algorithm shown in FIG. 15 will be described further in detail by the third embodiment.

Third embodiment

Figure 16:
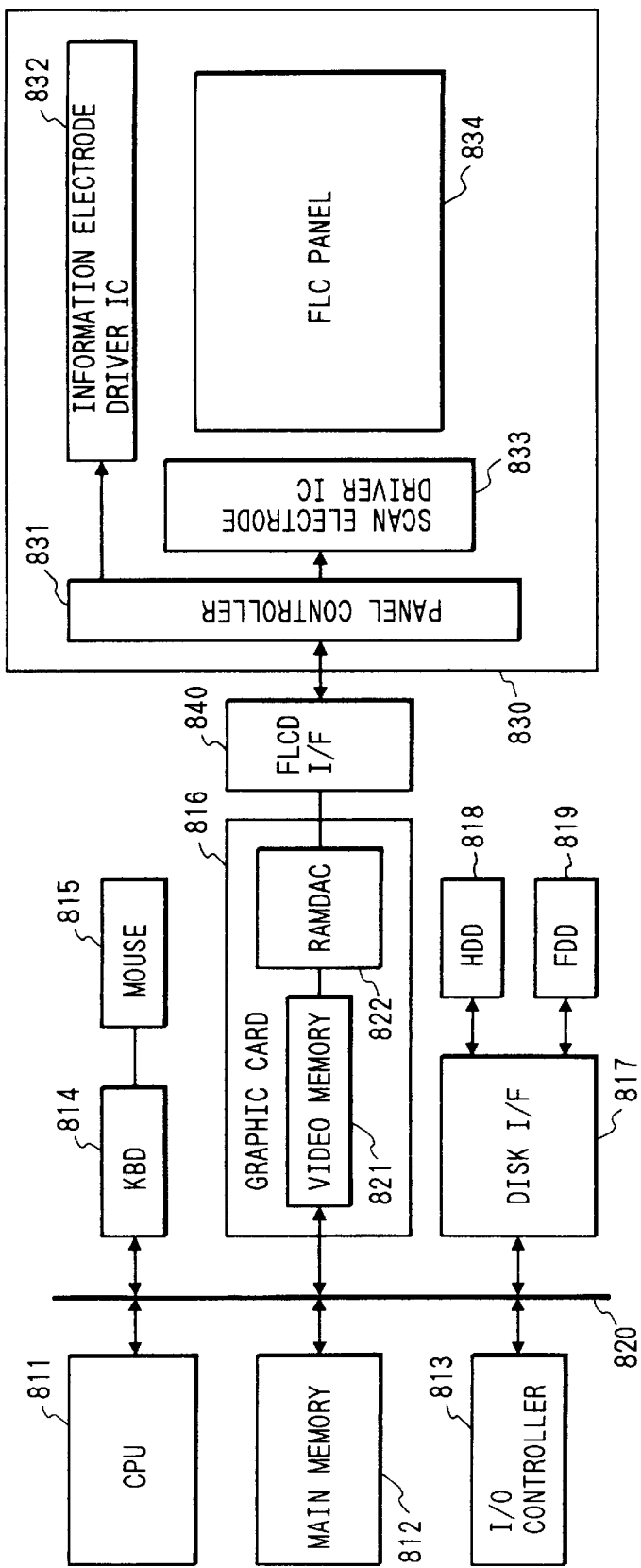
FIG. 16 is a block diagram showing a construction of an image processing system according to the third embodiment of the invention.

FIG. 16 is a block diagram showing a construction of an image display system according to the third embodiment of the invention. In FIG. 16, reference numeral 811 denotes a CPU for controlling the whole apparatus; 812 a main memory which is used to store programs which are executed by the CPU 811 and is used as a work area when the program is executed; 813 an input/output control apparatus (I/O controller) having an interface such as an RS-232C and the like; 814 a keyboard to input character information and control information from the user; 815 a mouse as a pointing device; 816 a graphic card for storing display data and for transferring a display signal to a display apparatus; 817 a disk interface for controlling a hard disk drive (HDD) 818 and a floppy disk drive (FDD) 819 as external memory apparatuses; and 820 a bus system comprising a data bus, a control bus, and an address bus for connecting signals among the above component elements. A video memory 821 and an RAMDAC 822 are built in the graphic card 816.

Reference numeral 830 denotes a ferroelectric liquid crystal display (hereinafter, simply referred to as an FLCD). The FLCD 830 comprises an FLC display panel 834 in which matrix-like electrodes are arranged and a ferroelectric liquid crystal is sealed in two glass plates which were subjected to an orientating process; an information electrode driver IC 832; a scan electrode driver IC 833; and a panel controller 831 to control the panel driving. Information electrodes and scan electrodes of the FLC panel 834 are connected to the information electrode driver IC 832 and scan electrode driver IC 833, respectively. Reference numeral 840 denotes a ferroelectric liquid crystal display interface (hereinafter, simply referred to as an FLCD interface) having the image processing apparatus of the invention.

The FLCD 830 which is used in the embodiment is a monochromatic (two or four gradations) display having a panel size of 15 inches and a resolution of [1280 dots (in the horizontal direction)×1024 (in the vertical direction) lines].

Figure 17:
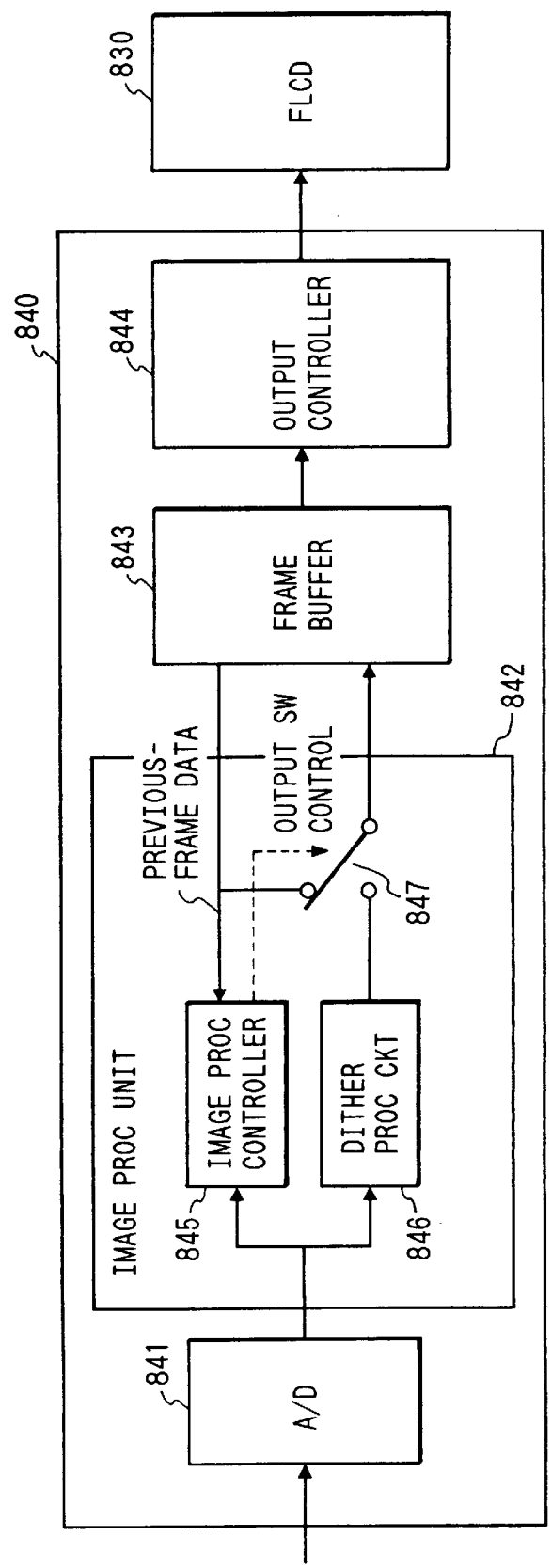
FIG. 17 is a block diagram showing a detailed construction of an FLC interface 840.

FIG. 17 is a block diagram showing a construction of the FLCD interface 840. In FIG. 17, reference numeral 841 denotes an A/D converter for converting luminance information of each pixel which is sent as an analog signal from the graphic card 816 to digital signal; 842 an image processing unit; 843 a frame buffer to store the image processing result of one frame; 844 an output controller for transferring data in the frame buffer 843 to the FLCD 830. The image processing unit 842 comprises an image processing controller 845, a dither processing circuit 846, and an output change-over switch 847.

The operation of the image processing unit 842 will now be described hereinbelow with respect to the case of a binary dither process in which an input value consists of eight bits and an output value consists of one bit and the number of pixels is set to (2×2).

Figure 18:
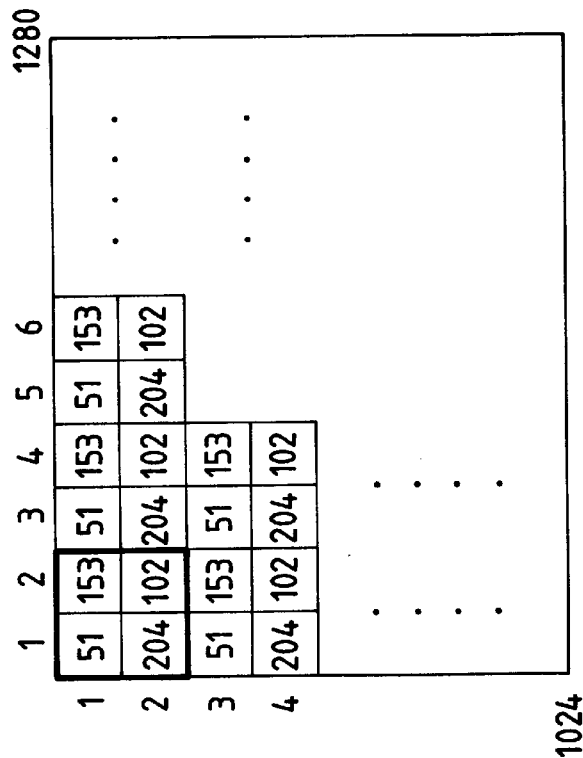
FIG. 18 is a diagram for explaining a pixel construction for a binary dither of (2×2) pixels.

FIG. 18 is a diagram showing a dither matrix of (2×2) pixels which is used by the dither processing circuit 846. The dither processing circuit 846 compares a luminance of each of the inputted pixels and threshold values of the dither matrix, thereby obtaining an output value. For example, the luminance of the pixel (1, 1) at the left upper edge is compared with a threshold value "51". When the luminance is smaller than "51", "0" is generated. When it is equal to or larger than "51", "1" is outputted. In a manner similar to the above, the luminance of the pixel (2, 1) is compared with a threshold value "153", the luminance of the pixel (1, 2) is compared with a threshold value "204", and the luminance of the pixel (2, 2) is compared with a threshold value "102", respectively. The same dither matrix is always used for each frame. Therefore, the threshold value of the pixel (1, 1) is always set to "51".

The image processing controller 845 controls an output from the output change-over switch 847 by using the luminance value of each pixel which is inputted to the dither processing circuit 846 and the processing result of the previous frame of such a pixel which was read out from the frame buffer 843 as parameters. The result stored in the frame buffer 843 is not always the result of the previous frame but there is a case where it becomes the result of the two- or three-previous frame.

The above process will now be described with reference to a flowchart shown in FIG. 19 showing the operation of the image processing unit 842.

First in step S710, data of one pixel [$l_{xy}$(n): n denotes the number of frames and x, y indicate a coordinate value in the horizontal (x) direction and a coordinate value in the vertical (y) direction which two-dimensionally determine an address in the frame memory] is inputted. In step S720, the binary dither process of (2×2) pixels is executed as mentioned above, thereby converting $l_{xy}$(n) to an output value [$D_{xy}$(n)]. Dither data [$D_{xy}$(n−1)] at the same position before one frame which was outputted to the frame buffer 843 by the dither process as mentioned above is read out from the frame buffer 843 in step S730. In the binary dither process, the output value [$D_{xy}$(n)] is set to "0" or "1".

In step S740, the image processing controller 845 discriminates whether the luminance [$l_{xy}$(n)] of a certain pixel inputted is close to a threshold value (t) of such a pixel or not. It is judged that the luminance is near the threshold value in the case where the input value [$l_{xy}$(n)] satisfies the following condition:

$$(t-a) \leq \text{input value } [l_{xy}(n)] \leq (t+b)$$

where, a, b (constant)$\geq 0$.

The values of (a) and (b) are decided in consideration of an inter-frame fluctuation width of the luminance which is caused when performing the analog/digital conversion and are set to values which are equal to or larger than such a fluctuation width. For example, in the embodiment, it is assumed that the inter-frame fluctuation width lies within a range of ±1 and a=b=1.

In the judgment in step S740, when it is judged that the input value is near the threshold value, the processing routine advances to step S750. The output change-over switch 847 is controlled and $D_{xy}$(n−1) is set to a dither output of the pixel. When it is judged that the input value is not close to the threshold value, the processing routine advances to step S760. The output change-over switch 847 is controlled and $D_{xy}(n)$ is set to a dither output of the pixel.

Figure 20:
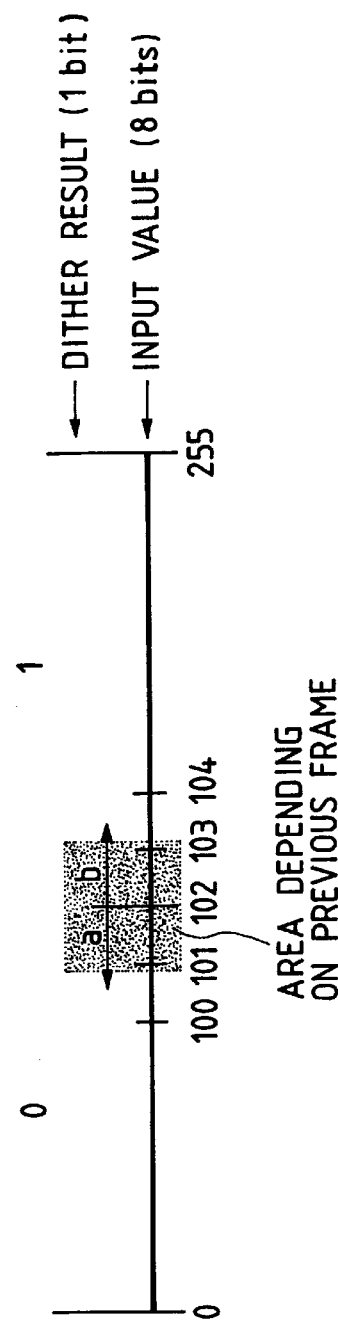
FIG. 20 is a diagram showing the relation between an input luminance and an output value by an image processing controller 845.

FIG. 20 is a diagram showing the relation between the input luminance and the output value by the image processing controller 845 in the third embodiment under the conditions of a=b=1 and t=102.

As already described above, when the luminance value $[l_{xy}(n)]$ of a certain pixel of a certain frame is not close to the threshold value (t), the image processing controller 845 sets the processing result $[D_{xy}(n)]$ of the dither processing circuit 846 to the output value. Namely, when $l_{xy}(n)<101$, the output value $[D_{xy}(n)]$ is set to "0". When $l_{xy}(n)>103$, the output value is set to "1". When $l_{xy}(n)$ is close to the threshold value (t), the image processing controller 845 sets the result of the same pixel which was read out from the frame buffer 843 is set to the output value. For example, in the case where the result stored in the frame buffer 843 because $l_{xy}(n)=103$ is such that $D_{xy}(n-1)=1$, the processing result $D_{xy}(n-1)$ stored in the frame buffer 843 is directly set to the output value=1. Such an operation is executed for every frame and every pixel. Although not shown in FIG. 20, in case of the first frame in which the result of the previous frame doesn't exist, the processing result $D_{xy}(n)$ of the dither processing circuit 846 is unconditionally set to the output value.

The case where the data such that the luminance value fluctuates within a range of ±1 every frame is actually inputted will now be considered.

Figures 21, 23:
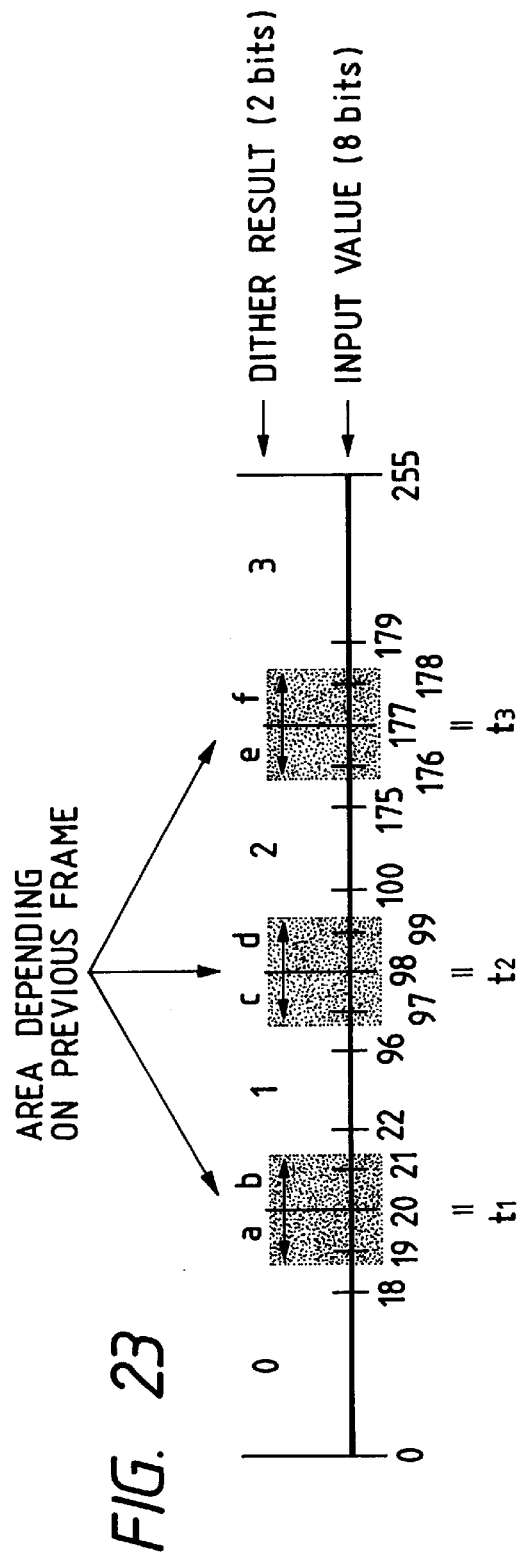
FIG. 21 is a diagram showing an example of an output value of every frame in the case where an input luminance value fluctuates by ±1 around 102 and 101 as centers, respectively.
FIG. 23 is a diagram showing the relation between an input luminance and an output value by an image processing controller 845.

FIG. 21 is a diagram showing an output value for every frame in the case where the input luminance value fluctuates within a range of ±1 around 102 and 101 as centers, respectively. The threshold value is set to "102" here. In FIG. 21, a processing result A shows the case where the process was performed in accordance with the conventional dither method. A processing result B shows the case where the foregoing process was executed. As will be also obviously understood from FIG. 21, according to the third embodiment, even when the input value fluctuates near the threshold value, the output value of the image process becomes constant at least after two frames.

A case where the input data is the luminance data of eight bits and the output becomes the result (output value consists of two bits) of the 4-level dither process of (2×2) pixels will now be described. Since the 4-level dither process of (2×2) pixels has already been described in the conventional apparatus, its description is omitted here. The dither processing circuit 846 executes the 4-level dither process of (2×2) pixels by using the threshold table shown in FIG. 2.

The dither processing circuit 845 compares the luminance value [input value: $l_{xy}(n)$] of the pixel (1, 1) at the left upper edge with three threshold values "10", "95", and "180" by using, for example, the threshold table 1 shown in FIG. 2. The output value $[D_{xy}(n)]$ which is obtained by the comparison is as follows. Namely, when $0 \leq l_{xy}(n)<10$, $D_{xy}(n)=0$ when $10 \leq l_{xy}(n)<95$, $D_{xy}(n)=1$ when $95 \leq l_{xy}(n)<180$, $D_{xy}(n)=2$ when $180 \leq l_{xy}(n) \leq 255$, $D_{xy}(n)=3$ In case of using the threshold table 2 shown in FIG. 2, the luminance value of the pixel (2, 1) is compared with threshold values "32", "117", and "202". Similarly, the luminance of the pixel (1, 2) is compared with threshold values "53", "138", and "223" by using the threshold table 3 shown in FIG. 2. The luminance of the pixel (2, 2) is compared with threshold values "74", "159", and "244" by using the threshold table 4 shown in FIG. 2.

Even in the 4-level dither process as mentioned above, the image processing controller 845 controls the output from the output change-over switch 847 by using the luminance value of each pixel which is inputted to the dither processing circuit 846 and the processing result of the previous frame of such a pixel which was read out from the frame buffer 843 as parameters.

Figure 22:
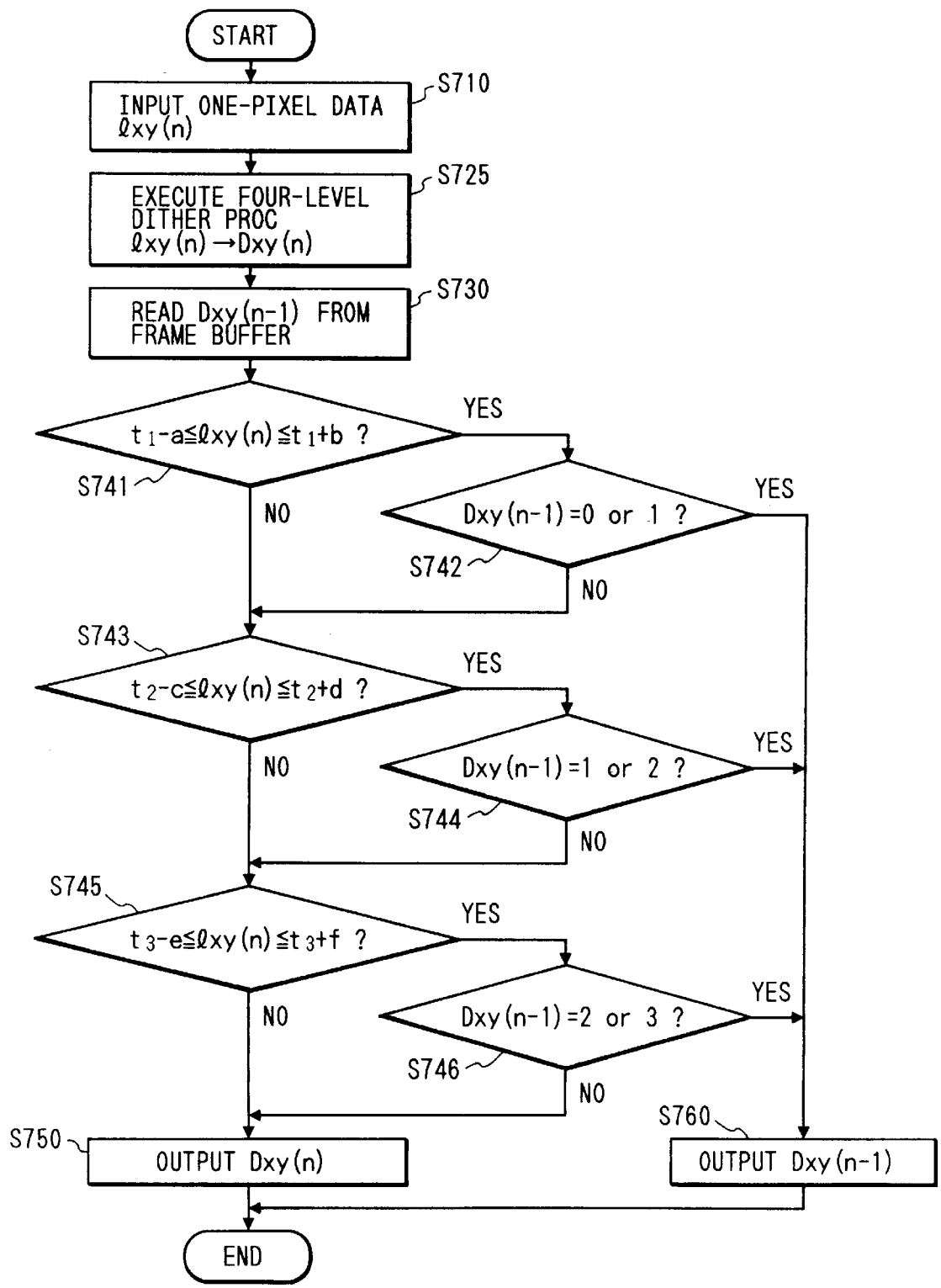
FIG. 22 is a flowchart showing the operation of the image processing unit 842 in case of executing a 4-level dither process of (2×2) pixels.

The above process will now be described with reference to a flowchart showing the operation of the image processing section 842 shown in FIG. 22. Processing steps which are common to the processing steps in the flowchart shown in FIG. 19 are designated by the same reference step numbers and their overlapped descriptions are omitted here.

After completion of the process in step S710, the 4-level dither process of (2×2) pixels is executed as mentioned above in step S725 and $l_{xy}(n)$ is converted to the output value $[D_{xy}(n)]$. After completion of the process in step S730, in steps S741 to S746, the image processing controller 845 discriminates whether the luminance $[l_{xy}(n)]$ of a certain pixel which was inputted is close to three threshold values (t1, t2, t3) regarding such a pixel or not. It is now assumed that those three threshold values are equal to t1=20, t2=98, and t3=177 as shown in FIG. 23, respectively. In FIG. 23, (a to f) denote constants of 0 or more. In consideration of the inter-frame fluctuation width of the luminance which occurs at the time of the analog/digital conversion, the values of (a to f) are determined to values which are equal to or larger than the fluctuation width. In the embodiment, it is assumed that the inter-frame fluctuation width lies within a range of ±1 in all of the luminances and that all of the values of (a to f) are set to "1". As described in the second embodiment, the values of (a to f) can be also changed every threshold value in a manner such that a=b=1, c=d=2, and e=f=3.

In the case where it is judged that the input value is not close to the threshold values in steps S741 to S746, the processing routine advances to step S50 and $D_{xy}(n)$ is set to the dither output of such a pixel.

That is, there is the following relation between the input value $[l_{xy}(n)]$ and the output value $[D_{xy}(n)]$.

When $0 \leq l_{xy}(n) \leq 18$, $D_{xy}(n)=0$

When $20 \leq l_{xy}(n) \leq 96$, $D_{xy}(n)=1$

When $100 \leq l_{xy}(n) \leq 175$, $D_{xy}(n)=2$

When $179 \leq l_{xy}(n) \leq 255$, $D_{xy}(n)=3$

In discriminating steps S741 to S746, when it is judged that the input value is close to the threshold values, the processing routine advances to steps S742, S744, and S746. A check is further made to see if the result $[D_{xy}(n-1)]$ of the same pixel of the previous frame which was read out from the frame buffer is equal to the value which can be used as an output value near the threshold value or not.

For example, in the case where the input value $[l_{xy}(n)]$ is close to the threshold value t1=20, a possible output value is equal to "0" to "1". Therefore, when the result of the previous frame is equal to "0" or "1", the value $[D_{xy}(n-1)]$ of the previous frame is set to the output value. When the result of the previous frame is other than "0" and "1", the luminance is compared with another threshold value.

When it is finally judged that the luminance is not close to all of the threshold values, the processing result $[D_{xy}(n)]$ of the dither processing circuit 46 is set to the output value.

A case where the luminance data which fluctuates in a range of ±1 every frame was actually inputted will now be considered.

FIG. 24 shows an output value for every frame in the case where the input luminance value fluctuates within a range of ±1 around 20 and 19 as centers, respectively. In FIG. 24, the processing result A shows the case where the process was executed in accordance with the conventional dither process. The processing result B shows the case where the foregoing process was performed. As will be obviously understood from FIG. 24, even in case of a multivalue dither, even when the input value fluctuates near the threshold value, the output value of the image process is set to be constant after two frames in a manner similar to the above.

According to the third embodiment, therefore, when the input value is close to the threshold value of the dither process, the dither processing result of the present frame is determined with reference to the dither processing result at the same position of one frame before. Therefore, the fluctuation of the inter-frame luminance value doesn't directly appear in the display output. The display picture quality can be improved.

Although the display system shown in the third embodiment uses the display panels of monochromatic two gradations and four gradations of the FLCD, the invention is not limited to such panels. For example, even in case of a system using a color panel in which one pixel is RRGGBB (6 bits/pixel) as an FLC panel, a similar result is obtained.

According to the third embodiment of the invention as described above, a check is made to see if the value of the inputted multivalue image data lies within a range near a predetermined threshold value or not. Either one of the mode in which the image data which has already been converted and stored is set to the image processing result and the mode in which the image data converted by the converting means is set to the image processing result is selected in accordance with the result of the discrimination. Therefore, when the above image processing result is outputted to, for example, the image processing display system which handles data such that the image data value of each pixel fluctuates every input frame, its output value becomes stable. Therefore, there is an effect such that a phenomenon (sparkling noises) such that many points of the display screen flicker and the picture quality is deteriorated in spite of the fact that the image is in a stationary state can be prevented.

Although the present invention has been described above with respect to the preferred embodiments, the invention is not limited to the foregoing embodiments but many modifications and variations are possible within the spirit and scope of the appended claims of the invention.

That is, the invention can be also applied to a system comprising a plurality of apparatuses or to an apparatus comprising only one apparatus. The invention can be also obviously applied to the case where the invention is accomplished by supplying a program to a system or an apparatus.

What is claimed is:

1. An image processing apparatus comprising:
   input means for inputting image data;
   quantizing means for quantizing the image data input by said input means to data of at least three or more levels;
   memory means for storing the data quantized by said quantizing means on a picture unit basis; and
   output means for outputting an image on the basis of the data stored in said memory means on said picture unit basis,
   wherein said quantizing means quantizes the image data of a present picture in accordance with the quantized data of a previous picture stored in said memory means,
   said quantizing means quantizes the input image data of one pixel to the data of three or more levels by using a plurality of threshold values,
   each of the plurality of threshold values includes an upper threshold value, a standard threshold value, and a lower threshold value,
   a deviation between the standard threshold value and upper or lower threshold value differs for each of the plurality of threshold values for quantizing the input image data of one pixel, and
   in said plurality of threshold values, the deviation of the lower threshold value is smaller than the deviation of the higher threshold value.

2. An apparatus according to claim 1, wherein when the quantized data of the previous picture is set to a level lower than the standard threshold value, said quantizing means quantizes the image data of the present picture by using the upper threshold value, and when the quantized data of the previous picture is set to a level higher than the standard threshold value, said quantizing means quantizes the image data of the present picture by using the lower threshold value.

3. An apparatus according to claim 2, further comprising processing means for gamma conversion processing the input image data,
   and wherein a deviation between said standard threshold value and said upper or lower threshold value is determined in accordance with a statistic expectation value regarding noises included in the input image data and gamma conversion processing characteristics.

4. An apparatus according to claim 1, wherein the deviation between said standard threshold value and said upper or lower threshold value is small as the level of the threshold value is low.

5. An apparatus according to claim 1, wherein said quantizing means discriminates whether the image data of the present picture which was inputted has a value near either one of said plurality of threshold values, and in the case where said image data is set to a value near said threshold value, a quantization value of the image data of the present picture is determined on the basis of the data stored in said memory means, and in the case where said image data is set to a value which is not near said threshold value, the quantization value of the image data of the present picture is decided in accordance with said plurality of threshold values.

6. An image processing apparatus comprising:
   input means for inputting image data;
   quantizing means for inputting image data;
   quantizing means for quantizing the input image data of one pixel which was input by said input means by using a plurality of threshold values;
   memory means for storing the data quantized by said quantizing means on a picture unit basis; and
   output means for outputting an image on the basis of the data stored in said memory on said picture unit basis
   wherein each of said plurality of threshold values includes an upper threshold value, a standard threshold value, and a lower threshold value, and when the quantized data of a previous picture is set to a level lower than said standard threshold value, said quantizing means quantizes the image data of a present picture by using said upper threshold value, and when the quantized data of the previous picture is set to a level higher than said standard threshold value, said quantizing means quantizes the image data of the present picture by using said lower threshold value,
   wherein a deviation between said standard threshold value and said upper or lower threshold value differs for each of said plurality of threshold values for quantizing the input image data of one pixel, and in said plurality of threshold values, the deviation of the lower threshold value is smaller than the deviation of the higher threshold value.

7. An apparatus according to claim 6, further comprising processing means for gamma conversion processing the input image data, and wherein a deviation between said standard threshold value and said upper or lower threshold value is determined in accordance with a statistic expectation value regarding noises included in said input image data and gamma conversion processing characteristics.

8. An apparatus according to claim 6, wherein the deviation between said standard threshold value and said upper or lower threshold value is small as the level of the threshold value is low.

9. An image processing method comprising:

an inputting step of inputting image data;

a quantizing step of quantizing the image data inputted by said inputting step to a data of at least three or more levels;

a storing step of storing the data quantized by said quantizing step on a picture unit basis; and an outputting step of outputting an image on the basis of the data stored on stored on said picture unit basis, wherein in said quantizing step, the image data of a present picture is quantized in accordance with the quantized data of a previous picture stored in said storing step, said quantizing step quantizes the input image data of one pixel to the data of three or more levels by using a plurality of threshold values, each of said plurality of threshold values includes an upper threshold value, a standard threshold value, and a lower threshold value, and a deviation between said standard threshold value and said upper or lower threshold value differs for each of said plurality of threshold values for quantizing the input image data of one pixel, and in said plurality of threshold values, the deviation of the lower threshold value is smaller than the deviation of the higher threshold value.

10. A method according to claim 9, wherein in said quantizing step, when the quantized data of the previous picture is set to a level lower than said standard threshold value, the image data of the present picture is quantized by using said upper threshold value, and when the quantized data of the previous picture is set to a level higher than said standard threshold value, the image data of the present picture is quantized by using said lower threshold value.

11. A method according to claim 10, further comprising a processing step of gamma conversion processing said input image data, and wherein the deviation between said standard threshold value and said upper or lower threshold value is determined in accordance with a statistic expectation value regarding noises included in said input image data and gamma conversion processing characteristics.

12. A method according to claim 9, wherein the deviation between said standard threshold value and said upper or lower threshold value is small as the level of the threshold value is low.

13. A method according to claim 9, wherein in said quantizing step, whether the image data of the present picture which was inputted is set to a value near either one of said plurality of threshold values or not is discriminated, and when said image data is set to a value near said threshold value, a quantization value of the image data of the present picture is determined on the basis of the data stored, and when said image data is set to a value which is not near said threshold value, the quantization value of the image data of the present picture is decided in accordance with said plurality of threshold values.

14. An image processing apparatus for inputting multi-value image data on a frame unit basis and for performing an image processing, comprising:

input means for inputting the multi-value image data which is expressed by a first number of bits per pixel;

converting means for comparing the multivalue image data inputted by said input means and a predetermined threshold value and for converting the multivalue image data which is expressed by said first number of bits to image data which is expressed by a second number of bits smaller than said first number of bits;

memory means for storing the image data produced by said converting means by an amount of at least one frame;

discriminating means for discriminating whether or not a value of the multivalue image data inputted by said input means is near said predetermined threshold value; and selecting means for selecting either one of a mode in which the image data which has already been stored in said memory means is set to a result of the image processing and a mode in which the image data produced by said converting means is set to the result of the image processing in accordance with the discrimination result provided by said discriminating means, wherein a near value in said discriminating means is defined by a first constant in a plus direction and a second constant in a minus direction around said predetermined threshold value as a center, wherein, as said predetermined threshold value, a plurality of threshold values are set in accordance with said second number of bits, and wherein a deviation between said predetermined threshold value and said first or second constant differs for each of said plurality of threshold values for quantizing the input image data of one pixel, in said plurality of threshold values, the deviation of the lower threshold value is smaller than the deviation of the higher threshold value.

15. An apparatus according to claim 14, wherein the multivalue image data inputted by said input means expresses a luminance value.

16. An apparatus according to claim 14, further comprising deciding means for examining the value of the image data which has already been stored in said memory means in the case where the value of the multivalue image data inputted by said input means lies within a value near either one of said predetermined threshold values, and for deciding either one of a mode in which the image data which has already been stored in said memory means is set to a result of the image process and a mode in which the image data converted by said converting means is set to the result of the image process in accordance with the result of the examination of said image data value.

* * * * *

UNITED STATES PATENT AND TRADEMARK OFFICE
CERTIFICATE OF CORRECTION

PATENT NO. : 5,909,512

DATED : June 1, 1999

INVENTOR(S) : Masamichi Ohshima et al.

It is certified that error appears in the above-identified patent and that said Letters Patent is hereby corrected as shown below:

COLUMN 1 line 50, "cells;" should read --cells--.

COLUMN 4 line 57, "arid 4." should read --and 4.--.

COLUMN 5 line 27, "assuming" should read --assuming that--;
line 53, "3405" should read --S405--; and
line 54, "Threshold" should read --threshold--.

COLUMN 9 line 30, "Component" should read --component--.

UNITED STATES PATENT AND TRADEMARK OFFICE
CERTIFICATE OF CORRECTION

PATENT NO.     : 5,909,512
DATED          : June 1, 1999
INVENTOR(S)    : Masamichi Ohshima et al.

It is certified that error appears in the above-identified patent and that said Letters Patent is hereby corrected as shown below:

<u>COLUMN 16</u> line 53, "basis" should read --basis,--.

<u>COLUMN 17</u> line 27, "stored on stored" should read --stored--; and
line 37, "value, and" should read --value,--.

Signed and Sealed this

Twenty-second Day of February, 2000

Attest:

Q. TODD DICKINSON

Attesting Officer

Commissioner of Patents and Trademarks